(12) United States Patent (10) Patent No.: US 9,158,723 B2
McClure et al. (45) Date of Patent: Oct. 13, 2015

(54) EXPANDED PROTOCOL ADAPTER FOR IN-VEHICLE NETWORKS

(76) Inventors: Robert E. McClure, Danville, IN (US); David M. Such, Greenwood, IN (US)

( * ) Notice: Subject to any disclaimer, the term of this patent is extended or adjusted under 35 U.S.C. 154(b) by 0 days.

(21) Appl. No.: 13/561,963

(22) Filed: Jul. 30, 2012

(65) Prior Publication Data

US 2013/0024587 A1 Jan. 24, 2013

Related U.S. Application Data

(63) Continuation of application No. 10/970,042, filed on Oct. 21, 2004, now abandoned, which is a continuation of application No. 09/942,130, filed on Aug. 29, 2001, now Pat. No. 7,152,133.

(60) Provisional application No. 60/229,008, filed on Aug. 30, 2000.

(51) Int. Cl.
*G06F 13/36* (2006.01)
*G06F 13/38* (2006.01)

(52) U.S. Cl.
CPC ................................ *G06F 13/385* (2013.01)

(58) Field of Classification Search
CPC .................................................. G06F 13/385
USPC ......... 710/305–306, 315–317, 104; 701/1–31
See application file for complete search history.

(56) References Cited

U.S. PATENT DOCUMENTS

| | | | |
|---|---|---|---|
| 4,720,807 A | 1/1988 | Ferran et al. | |
| 5,293,317 A | 3/1994 | Adrain et al. | |
| 5,347,524 A | 9/1994 | I'Anson et al. | |
| 5,459,660 A | 10/1995 | Berra | |
| 5,541,840 A | 7/1996 | Gurne et al. | |
| 5,646,535 A | 7/1997 | Dornier | |
| 5,764,156 A | 6/1998 | Chaloux | |
| 5,832,240 A * | 11/1998 | Larsen et al. | 710/105 |
| 5,870,573 A | 2/1999 | Johnson | |
| 5,881,281 A | 3/1999 | Gates et al. | |
| 5,896,569 A | 4/1999 | Butler et al. | |
| 5,908,455 A | 6/1999 | Parvahan | |
| 6,081,858 A | 6/2000 | Abudayyeh et al. | |
| 6,122,684 A | 9/2000 | Sakura | |
| 6,181,992 B1 | 1/2001 | Gurne et al. | |
| 6,184,780 B1 * | 2/2001 | Allen et al. | 340/426.3 |
| 6,193,359 B1 | 2/2001 | Patil et al. | |
| 6,259,891 B1 * | 7/2001 | Allen | 455/3.02 |
| 6,320,876 B1 | 11/2001 | Virdee et al. | |
| 6,338,010 B1 * | 1/2002 | Sparks et al. | 701/1 |
| 6,389,337 B1 | 5/2002 | Kolls | |
| 6,466,029 B2 | 10/2002 | Stroth et al. | |

(Continued)

*Primary Examiner* — Tim T Vo
*Assistant Examiner* — Kim T Huynh
(74) *Attorney, Agent, or Firm* — Warn Partners, P.C.

(57) ABSTRACT

A protocol adapter for in-vehicle networks that provides diagnostics, analysis and monitoring. The protocol adapter has a pass-through feature (voltage translator)/smart mode that allows the protocol adapter to emulate older boxes. Visual indicators (LEDs) indicate the pass through feature is in operation. LEDs also indicate activity on the RS232 bus between the adapter and a PC. Single color and multiple color emitting LEDs indicate a program is being executed and identify the program that is being executed. The protocol adapter supports RP1202 and RP1210, J1708 and J1939 and J1939 Transport Layer. The protocol adapter has a Real Time Clock, Standard COMM port connection, 7-32 Volt Supply and is CE compliant. The adapter can be used wirelessly.

24 Claims, 30 Drawing Sheets

(56) References Cited

U.S. PATENT DOCUMENTS

| | | |
|---|---|---|
| 6,486,801 B1 | 11/2002 | Jones |
| 6,526,340 B1 * | 2/2003 | Reul et al. .................... 701/29.3 |
| 6,564,285 B1 * | 5/2003 | Mills et al. .................... 711/103 |
| 6,647,323 B1 | 11/2003 | Robinson et al. |
| 6,751,484 B1 | 6/2004 | Sandelius et al. |
| 7,152,133 B2 | 12/2006 | McClure et al. |
| 7,603,471 B2 | 10/2009 | Sodergren |
| 2002/0039026 A1 * | 4/2002 | Stroth et al. .................... 324/509 |
| 2003/0120851 A1 | 6/2003 | Gafford et al. |
| 2012/0198120 A1 | 8/2012 | Blanton et al. |

\* cited by examiner

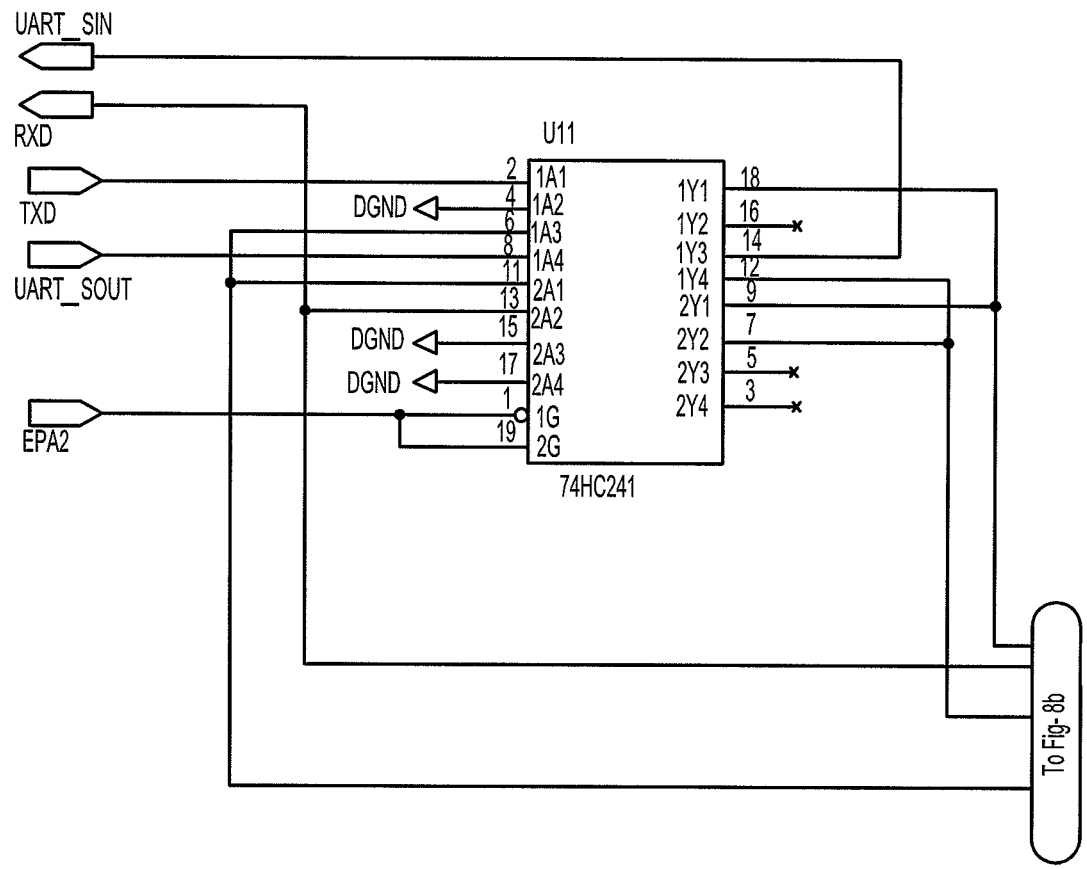
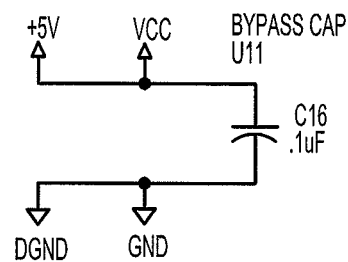
FIG - 8a

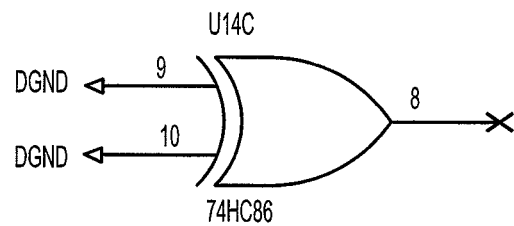
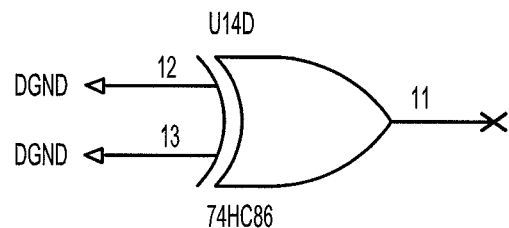
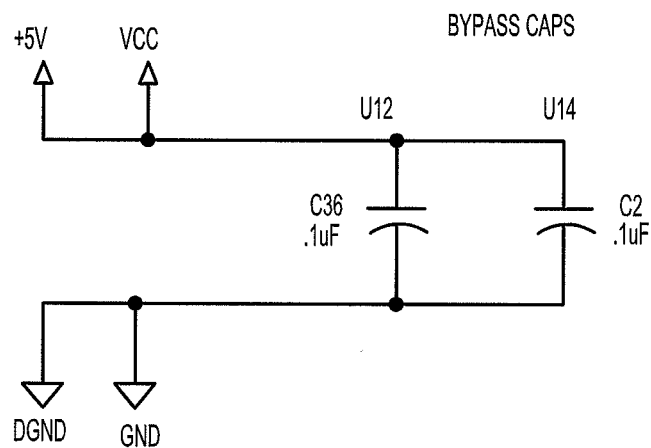
FIG - 20

DPA III PLUS - LED DESCRIPTIONS

LED No.1 (red) - Black text, Power, indicates power on when illuminated.

FIG - 21

LED No.2 - Black text, Mode, plus red and green text as shown below:

| Red text | Corresponding meaning for LED when illuminated (red) |
|---|---|
| DPA | Normal operation of the DPA unit. Flashes red only when serial communications with PC is occurring. |

| Green text | Corresponding meaning for LED when illuminated (green) |
|---|---|
| PASS | Normal DPA operation is suspended, and the protocol pass-through functionality is activated. Indicated by steady flashing green. |

| Note: | Alternating red/green indicates reflash (reprogramming) in progress. |
|---|---|

FIG - 22

LED No.3 - Red and green text as shown below:

| Red text | Corresponding meaning for LED when illuminated (red) |
|---|---|
| J1939 | Dual-wire CAN is in operation: (J1939, Standard CAN or J2284 High-speed CAN) Flashes red when valid bus traffic is present. |

| Green text | Corresponding meaning for LED when illuminated (green) |
|---|---|
| SW CAN | Single-wire CAN is in operation: J2411 (if implemented). Flashes green for bus traffic. |

FIG - 23

DPA III PLUS - LED DESCRIPTIONS

LED No.4 - Red and green text as shown below:

| Red text | Corresponding meaning for LED when illuminated (red) |
|---|---|
| J1850 | Chrysler J1850 protocol is in operation (if implemented). Flashes red for bus traffic. |

| Green text | Corresponding meaning for LED when illuminated (green) |
|---|---|
| Class II | GM Class II J1850 protocol is in operation. Flashes green for bus traffic. |

*FIG - 24*

LED No.5 - Red and green text as shown below:

| Red text | Corresponding meaning for LED when illuminated (red) |
|---|---|
| J1708 | J1708 protocol is in operation. Flashes red for bus traffic. |

| Green text | Corresponding meaning for LED when illuminated (green) |
|---|---|
| UART | One of several UART protocols is in operation: GM Class I (ALDL), ISO 9141-2, ISO 9141-1989, ISO-9141-Special (for Case). Flashes green for bus traffic. |

*FIG - 25*

Note: See the diagram on the following page for LED locations on the DPA III unit.

EXPANDED PROTOCOL ADAPTER FOR IN-VEHICLE NETWORKS

CROSS-REFERENCE TO RELATED APPLICATIONS

This application is a Continuation Application of U.S. patent application Ser. No. 10/970,042, titled Expanded Protocol Adapter for In-Vehicle Networks, filed Oct. 21, 2004, now abandoned which is a Continuation Application of U.S. patent application Ser. No. 09/942,130, titled Expanded Functionality Protocol Adapter for In-Vehicle Networks, filed Aug. 29, 2001, now U.S. Pat. No. 7,152,133 which claims the benefit of the priority date of U.S. Provisional Patent Application Serial No. 60/229,008, titled Expanded Functionality Protocol Adapter for In-Vehicle Networks, filed Aug. 30, 2000.

This application is also related to U.S. Pat. No. 6,772,248, titled Protocol Adapter For In-Vehicle Networks, issued Aug. 3, 2004, and U.S. patent application Ser. No. 10/888,432, titled Protocol Adapter For Passing Diagnostic Messages Between Vehicle Networks and a Host Computer, filed Jul. 9, 2004.

BACKGROUND OF THE INVENTION

The field of the invention pertains to in-vehicle networks for diagnostics, analysis and monitoring. The networks integrate with PC gateways for data acquisition, computer-based measurement, and automation systems with in-vehicle communication. However, in the past, when hardware components were upgraded, existing software could become non-compatible with the upgraded hardware. Manufacturers of various tools attempted to remedy these compatibility problems by using a box to talk to multiple data links. This was not very satisfactory and a better solution to this problem was needed.

SUMMARY OF THE INVENTION

The invention is an expanded protocol adapter for in-vehicle use. The protocol adapter of the invention is a diagnostic tool that can bridge a lap-top or bench-top or other computer to a vehicle network. The expanded protocol adapter has additional capabilities beyond earlier versions. It is advantageous for research and development applications, end of line testing and design and production applications, such as quality control, life-cycle testing and burn-in applications. The protocol adapter of the invention solves the above-identified problem by operating as a translator box that works with a variety of software packages. Thus, the protocol adapter is operable with existing diagnostic software packages.

Additional advantages and features of the present invention will become apparent from the following description and appended claims, taken in conjunction with the accompanying drawings.

BRIEF DESCRIPTION OF THE DRAWINGS

FIG. 20 illustrates Unused Gates;
FIG. 21 illustrates LED No. 1 description;
FIG. 22 illustrates LED No. 2 description;
FIG. 23 illustrates LED No. 3 description;
FIG. 24 illustrates LED No. 4 description;
FIG. 25 illustrates LED No. 5 description.

DESCRIPTION OF THE EMBODIMENTS OF THE INVENTION

Figure 1:
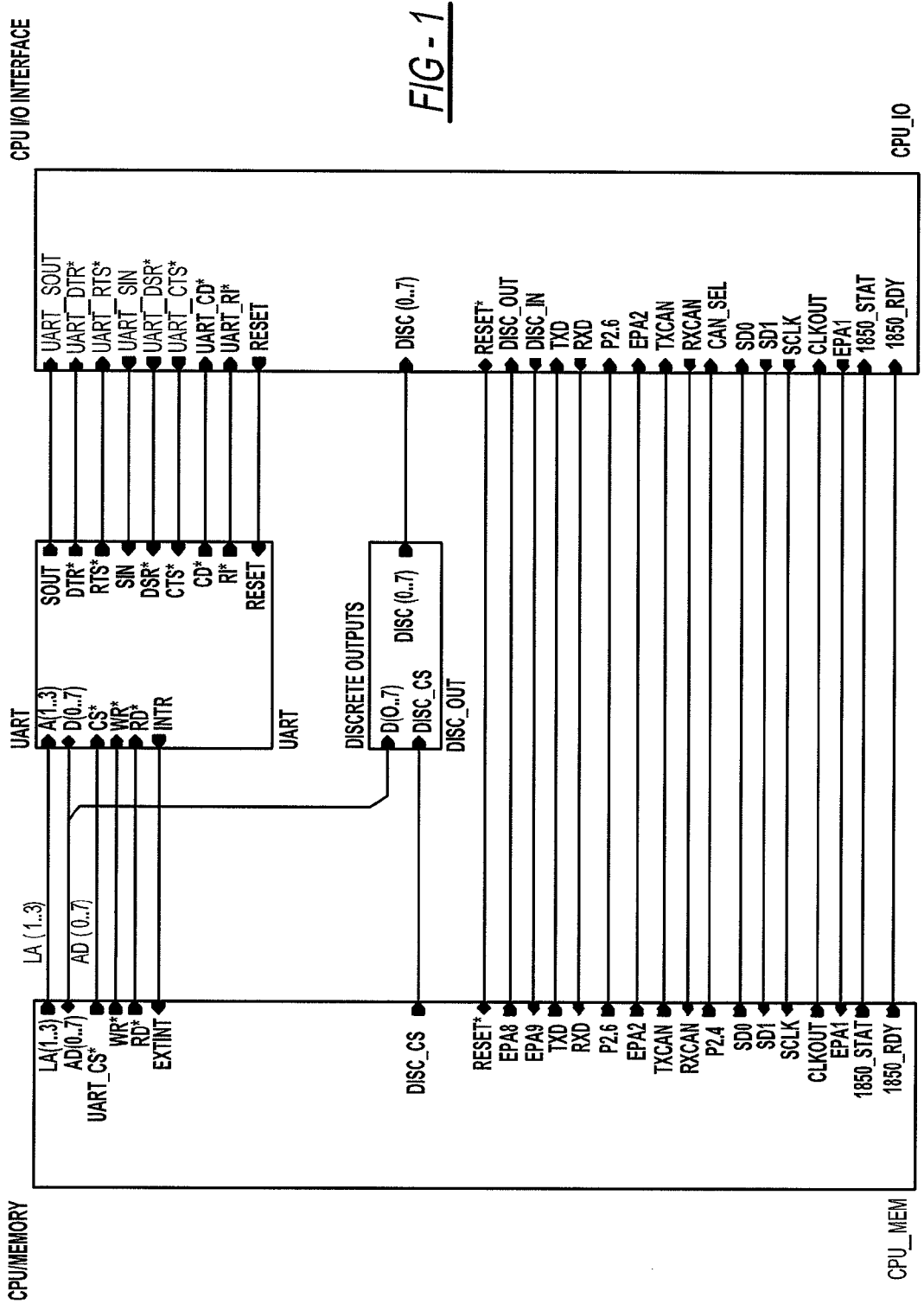
FIG. 1 illustrates DPA III Plus CPU board.
Figure 2A:
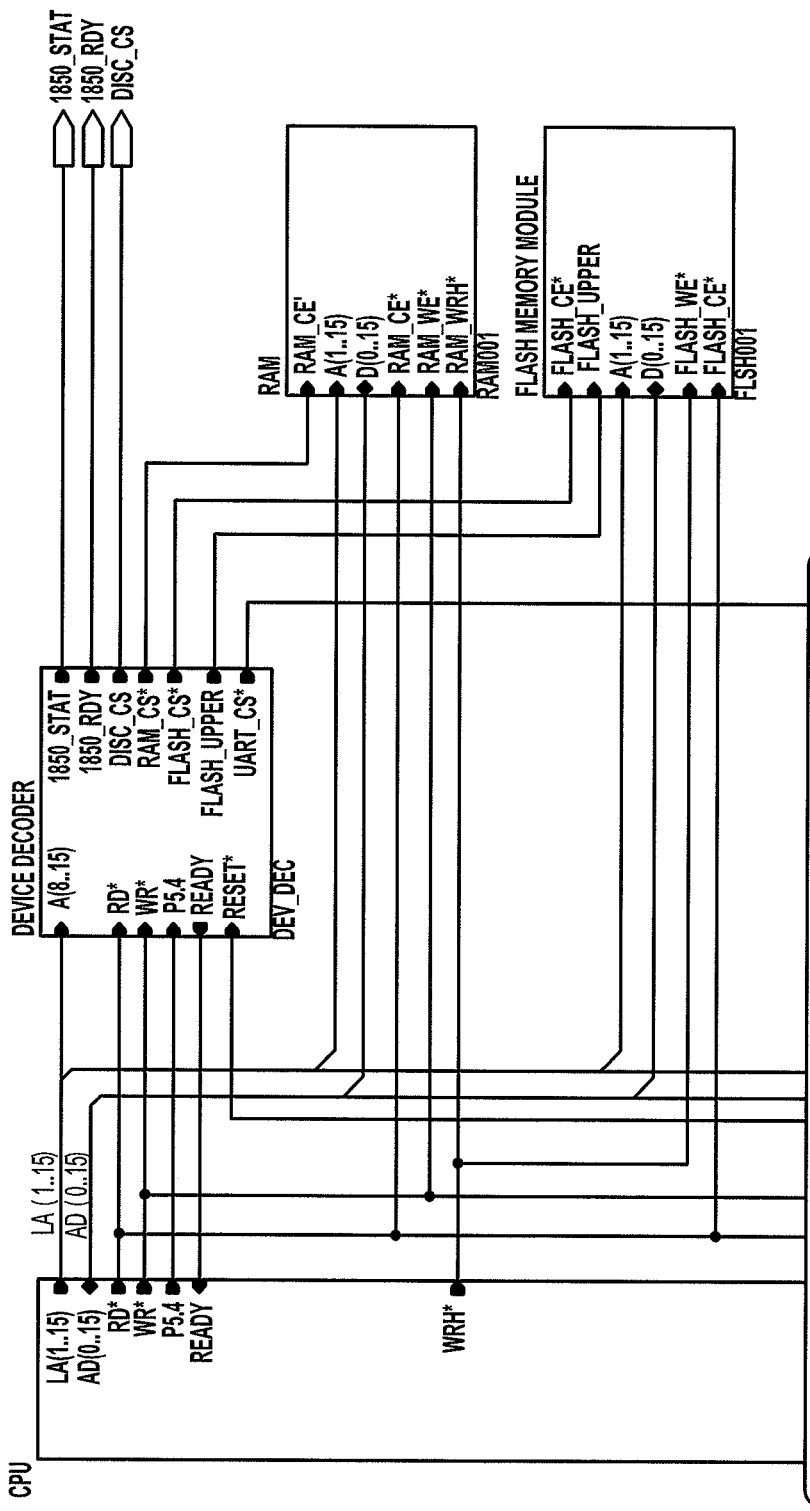
FIG. 2 illustrates CPU Memory Module.
Figure 2B:
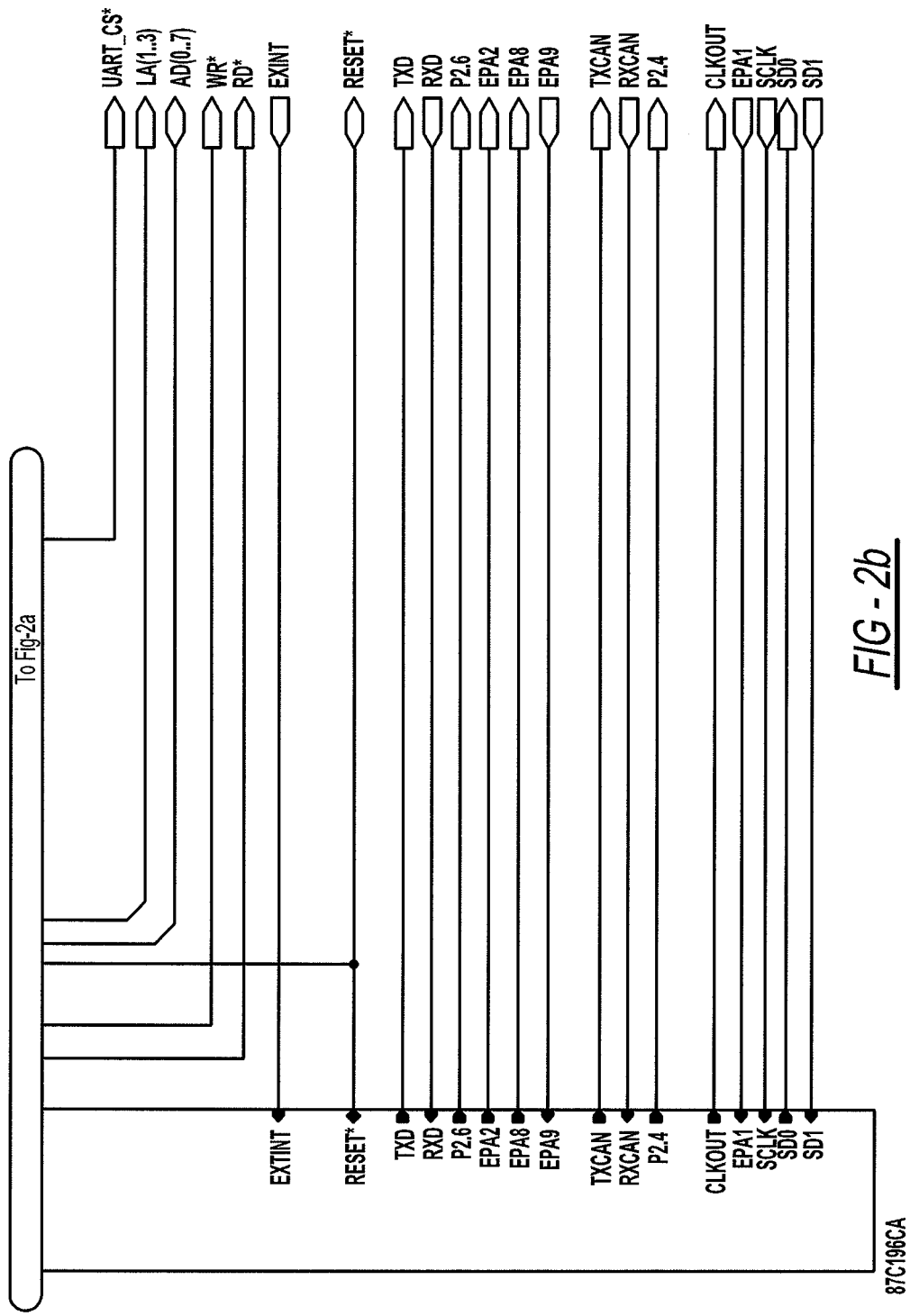
Figure 3A:
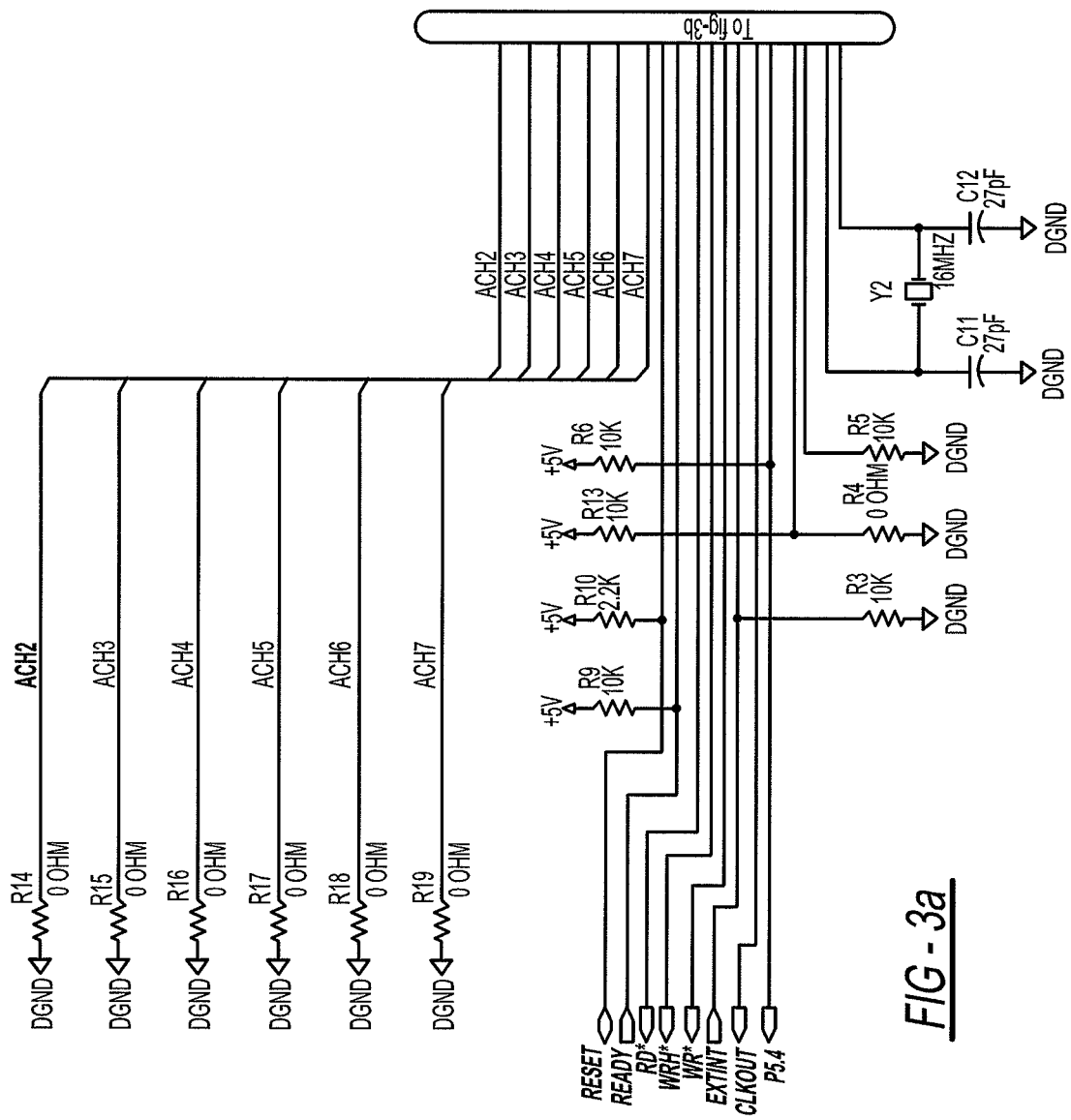
FIG. 3 illustrates Central Processing Unit.
Figure 3B:
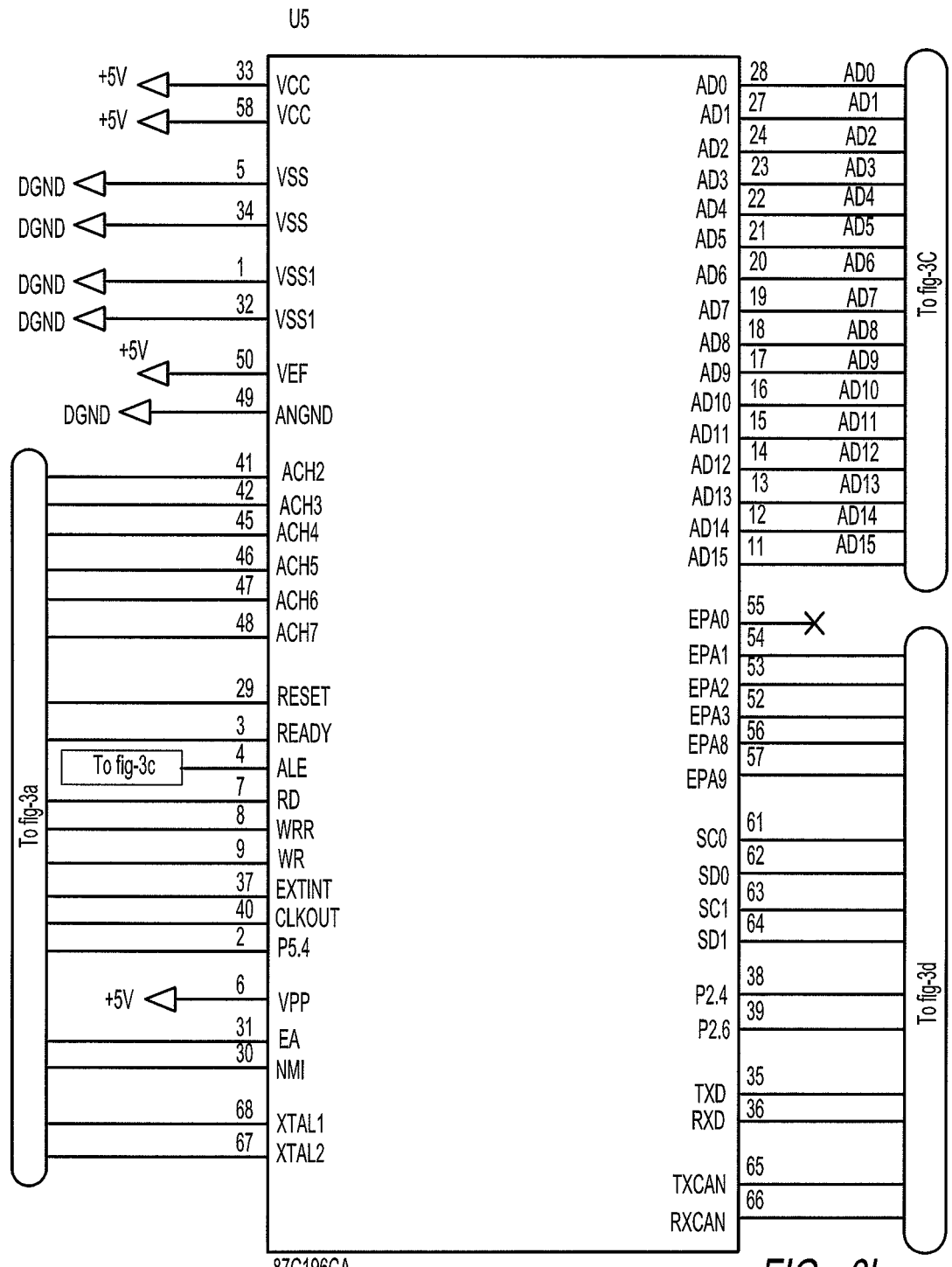
Figure 3C:
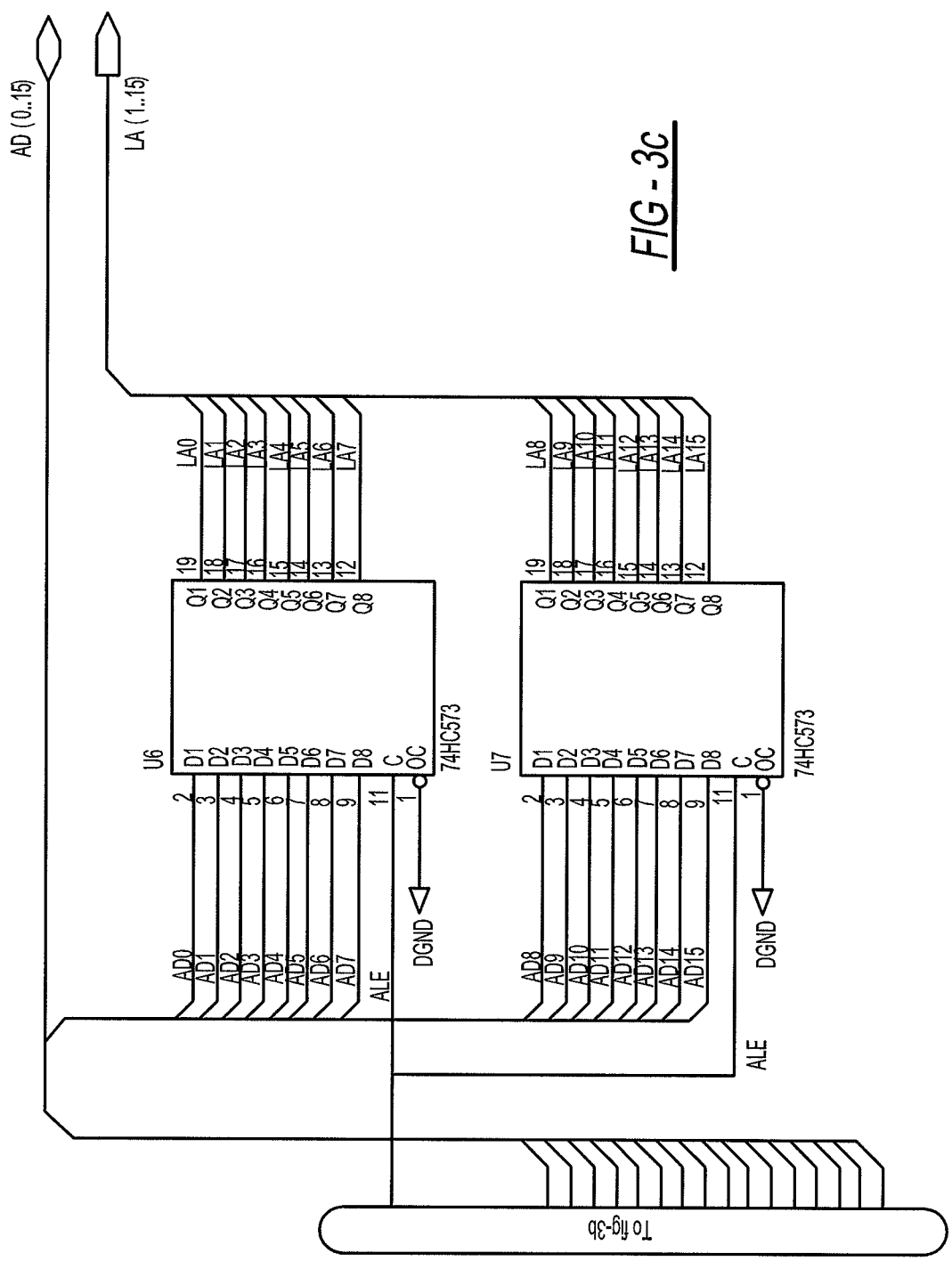
Figure 3D:
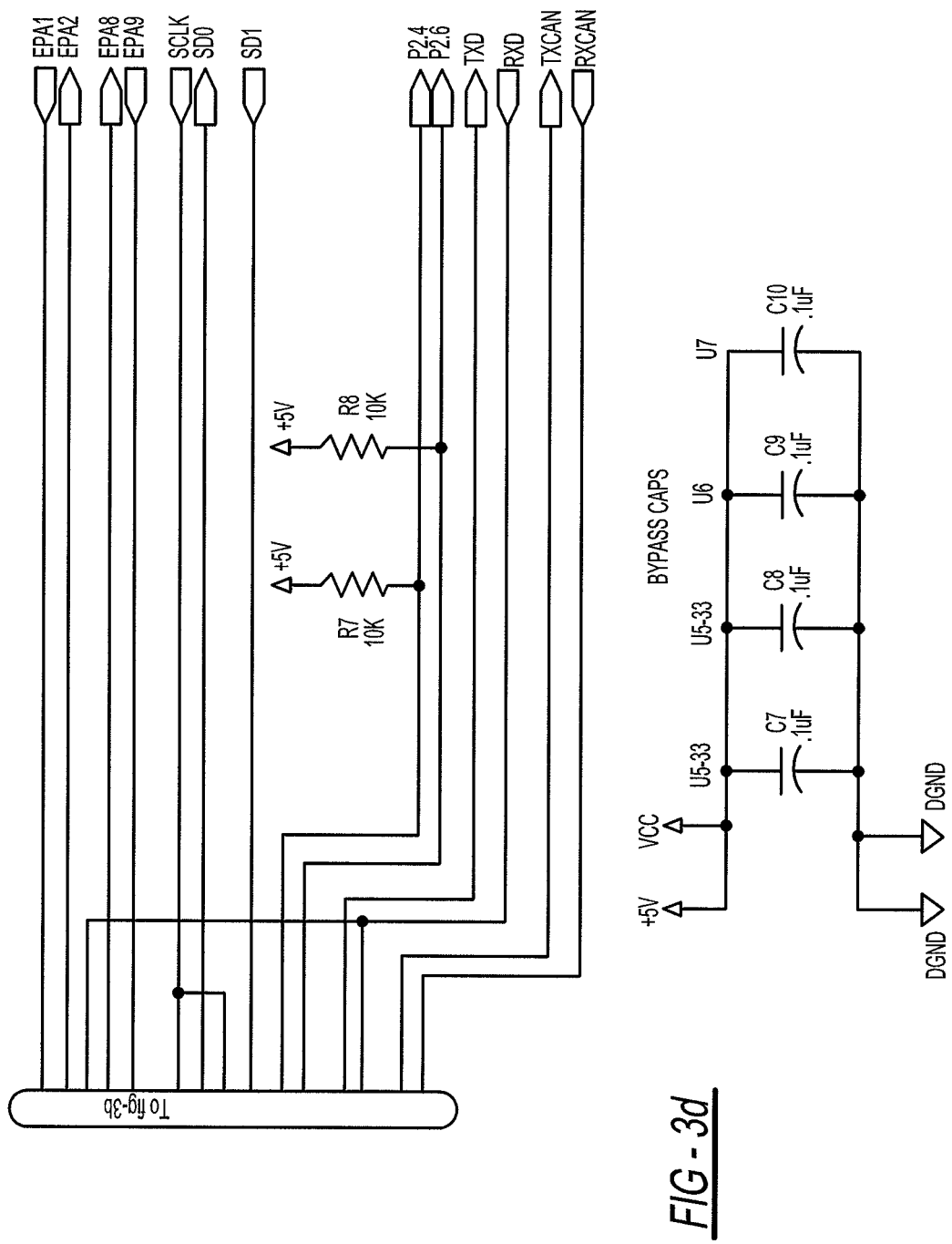
Figure 4:
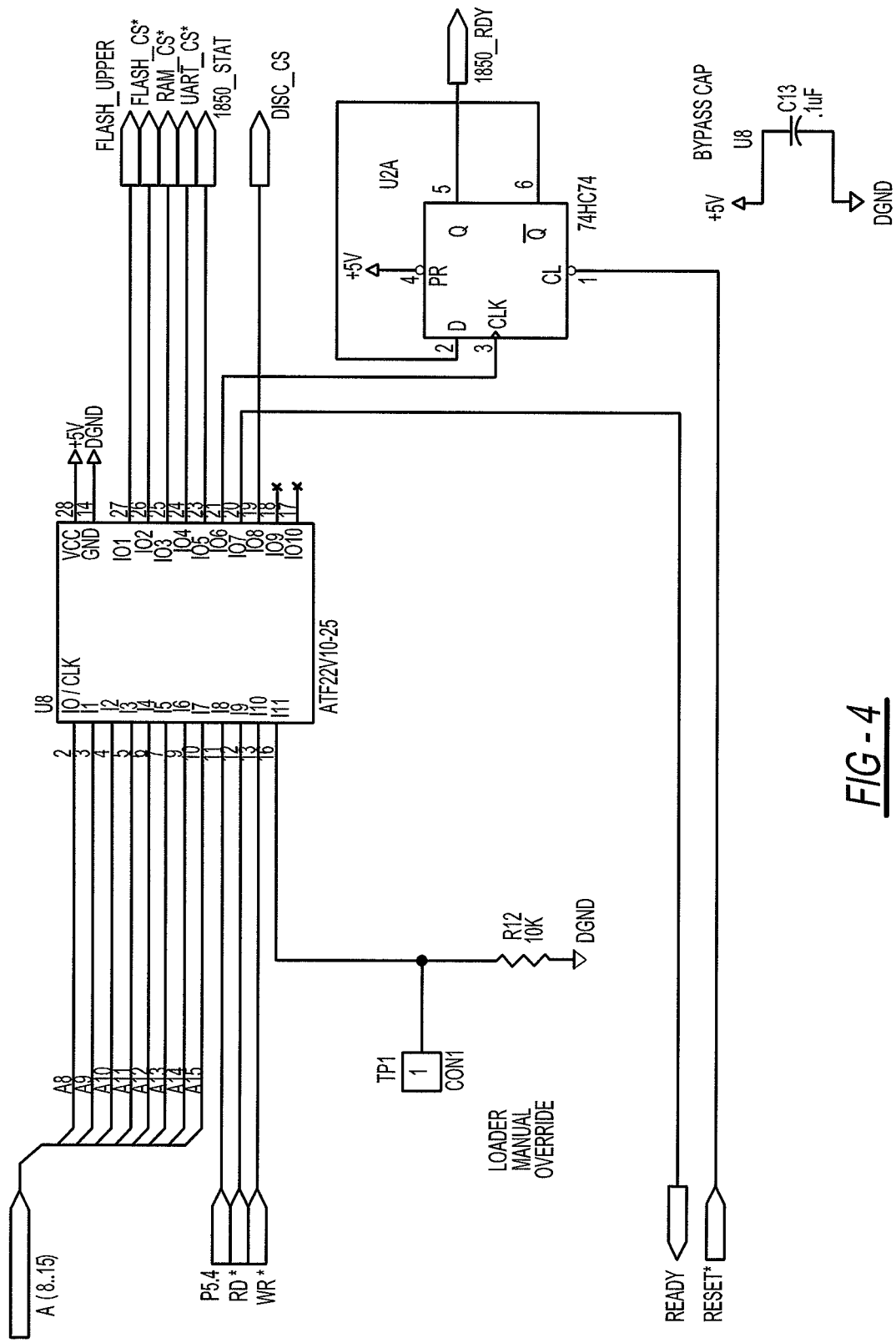
FIG. 4 illustrates Device Decoder.
Figure 5:
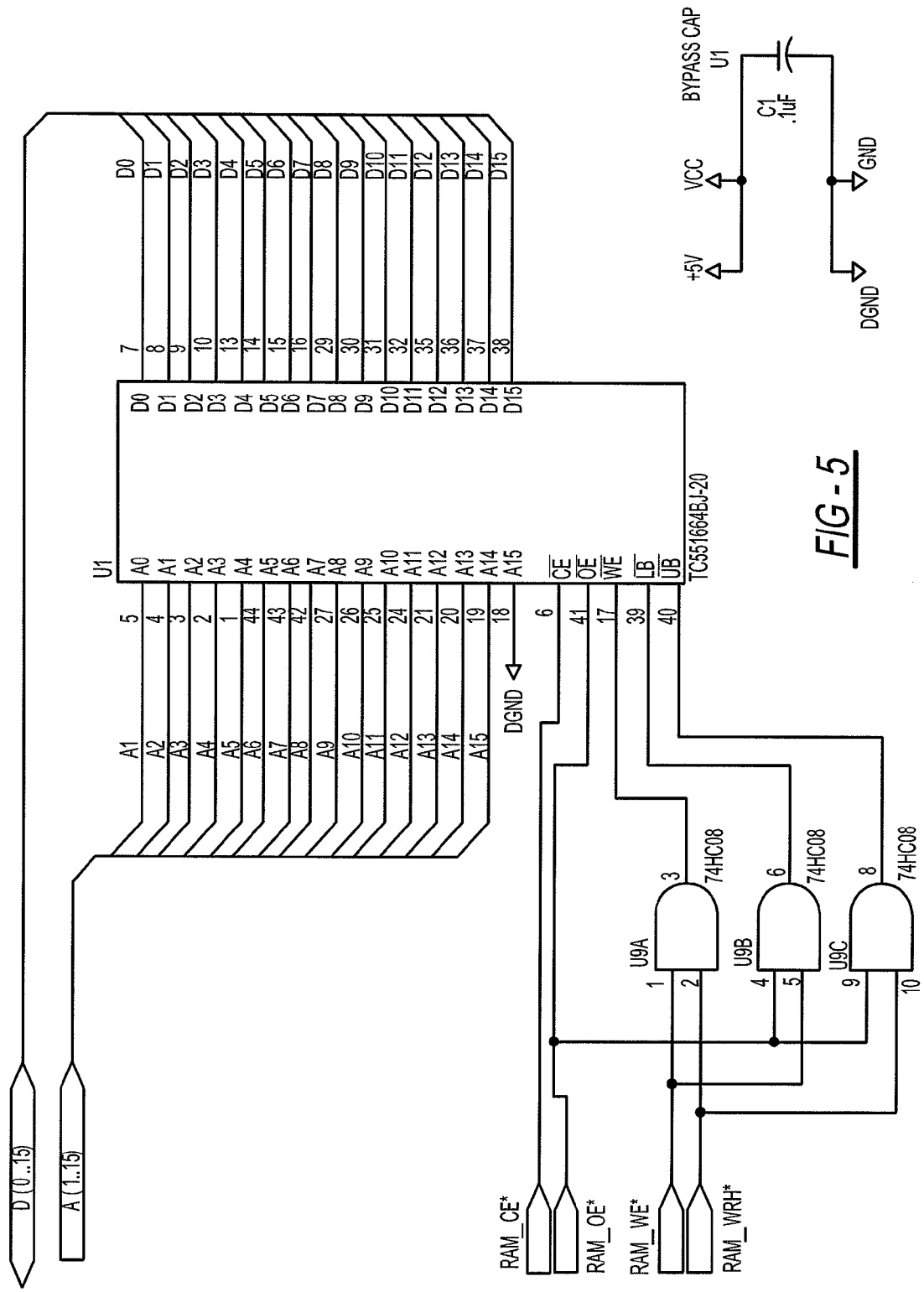
FIG. 5 illustrates static RAM Module.
Figure 6:
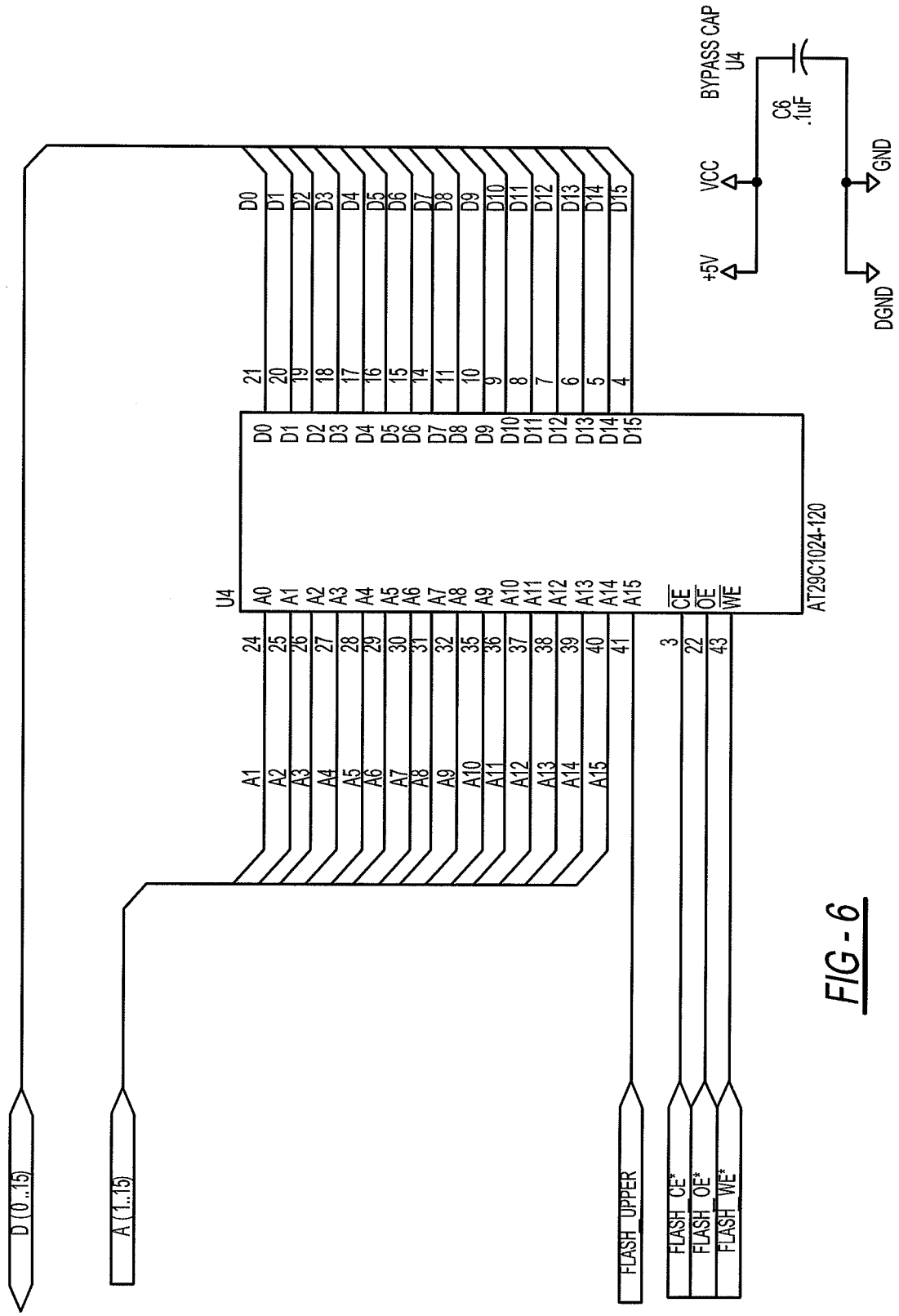
FIG. 6 illustrates Flash Memory Module.
Figure 7:
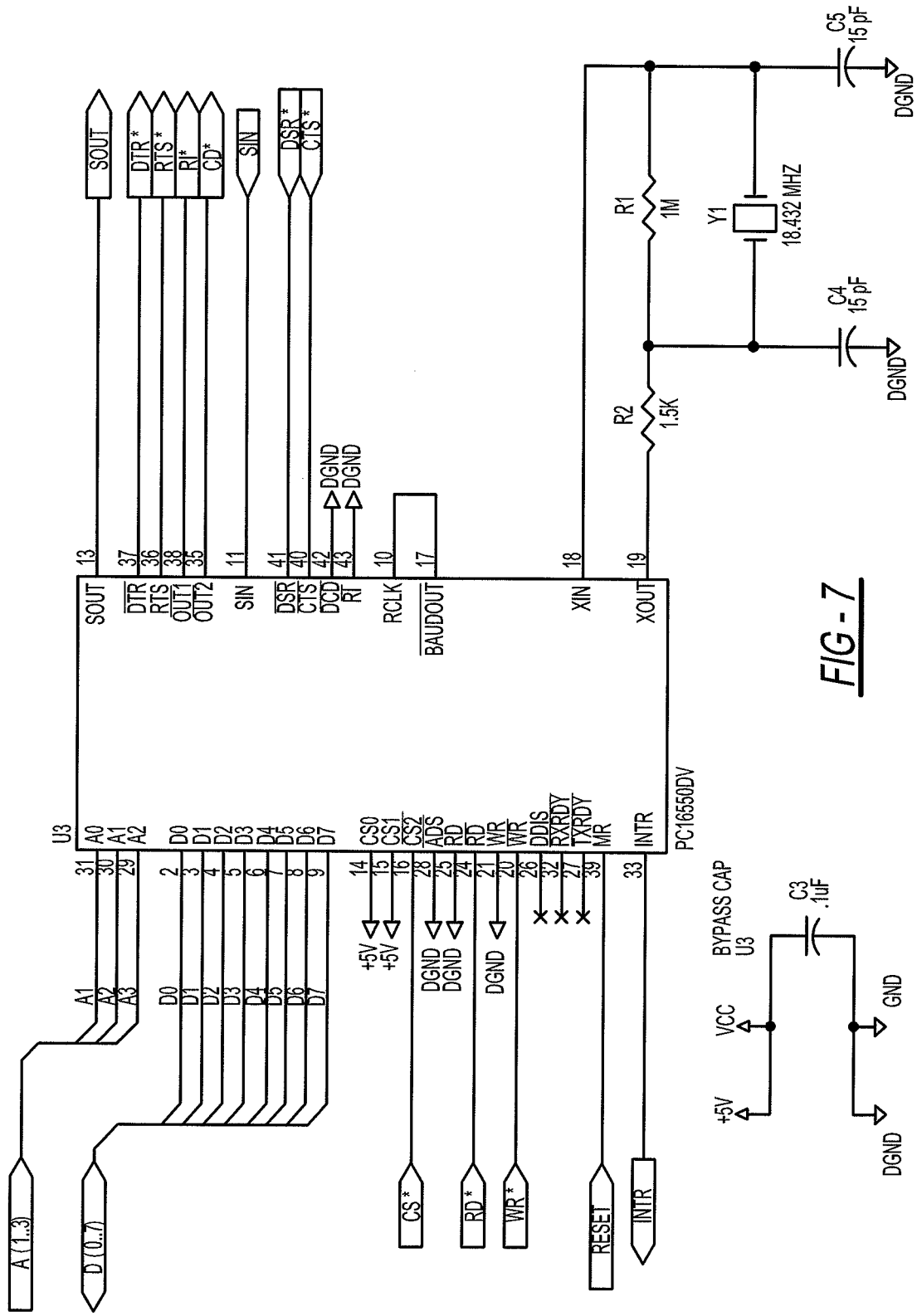
FIG. 7 illustrates UART.
Figure 8B:
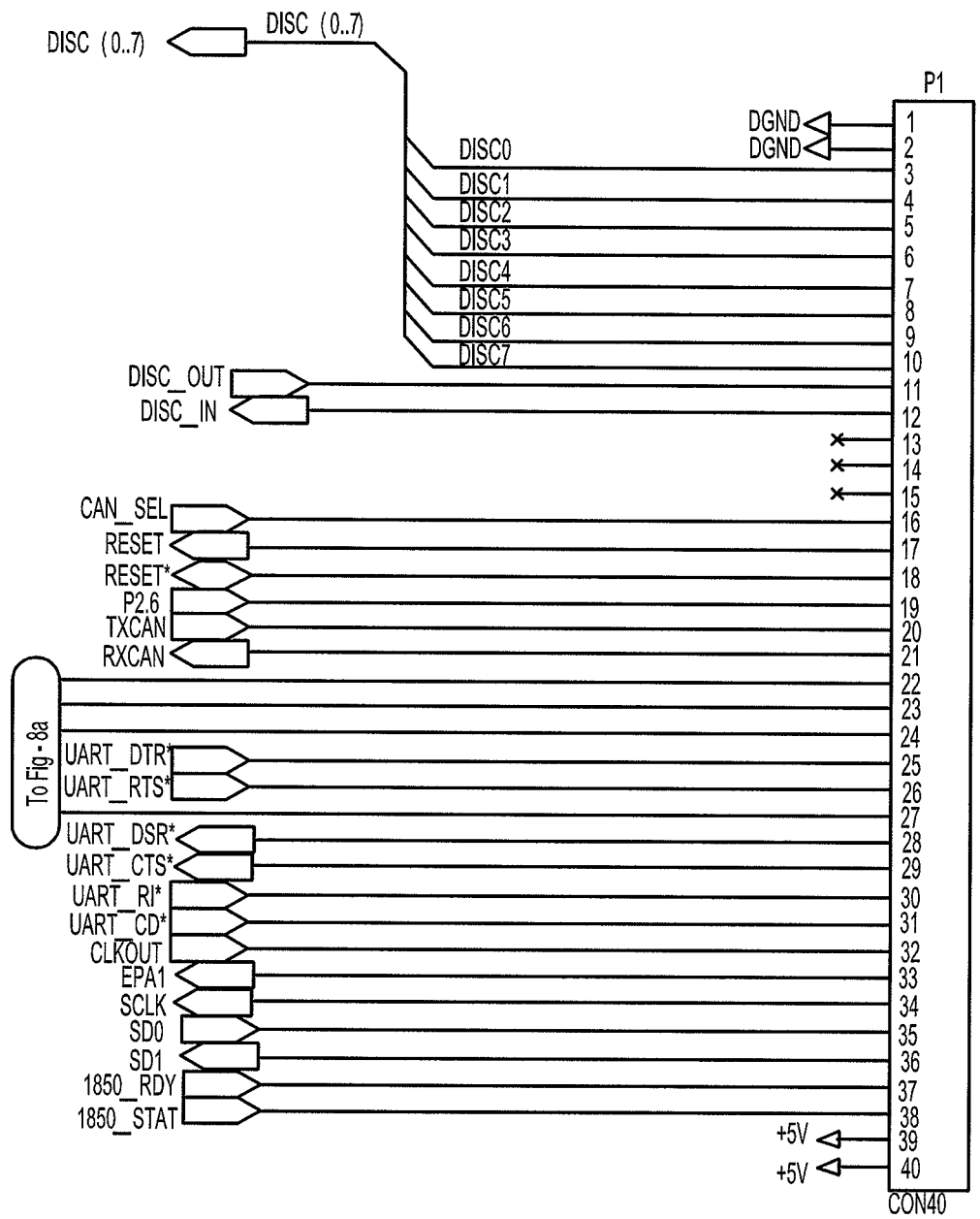
FIG. 8 illustrates CPU/I/O Interface Connectors.
Figure 9:
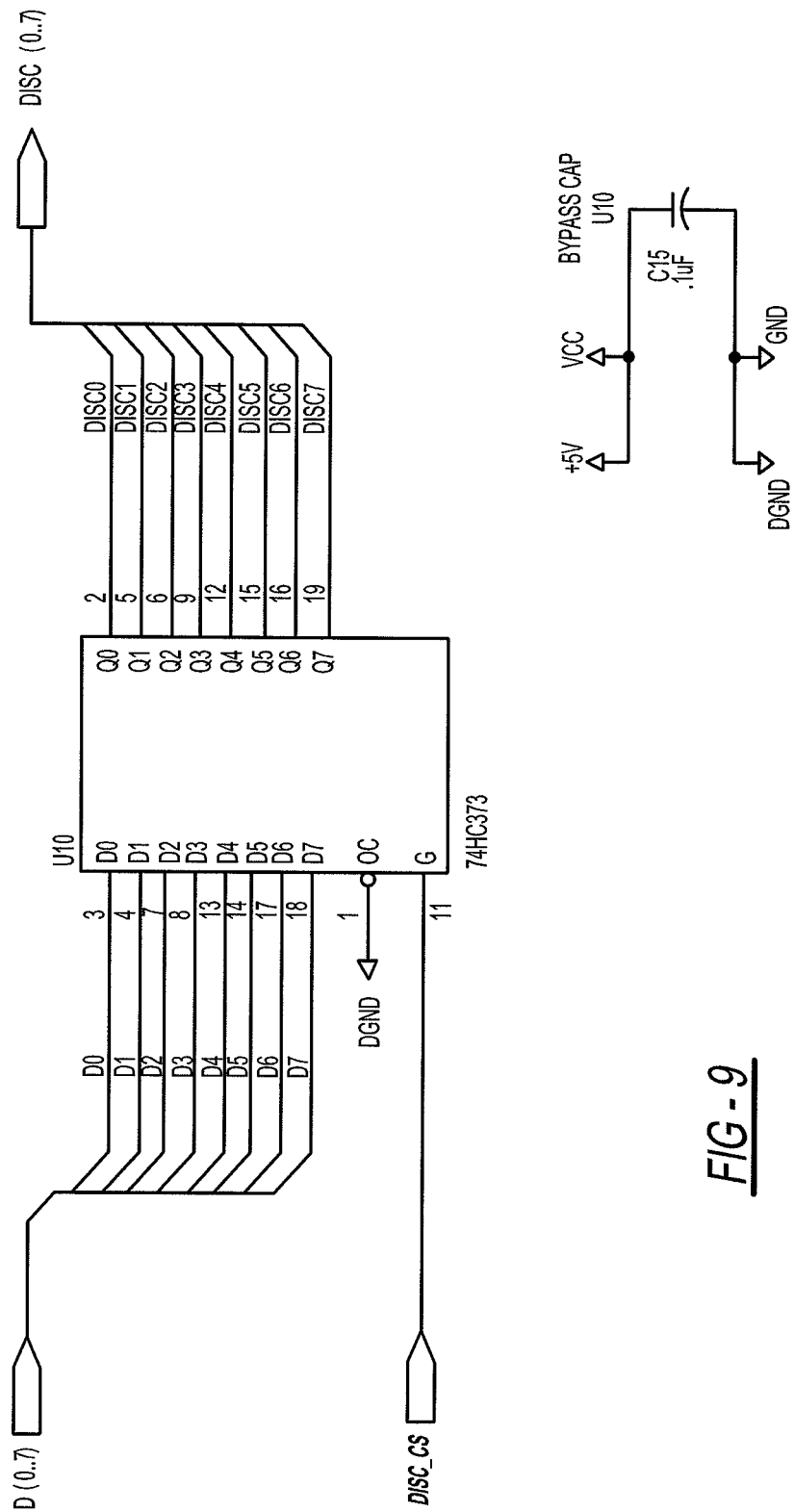
FIG. 9 illustrates Discrete Output Latch.
Figure 10:
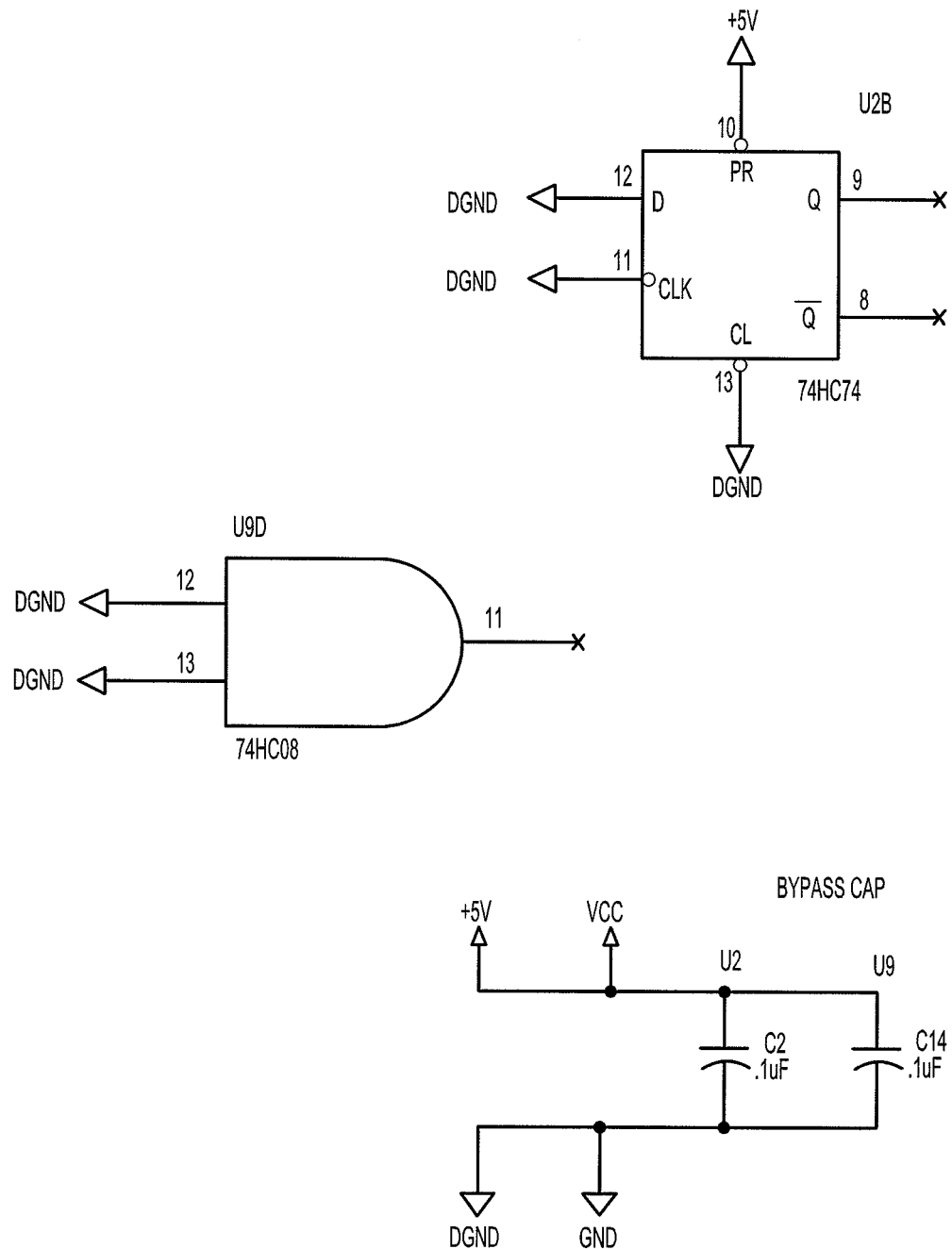
FIG. 10 illustrates Unused Spare Gates.
Figure 11A:
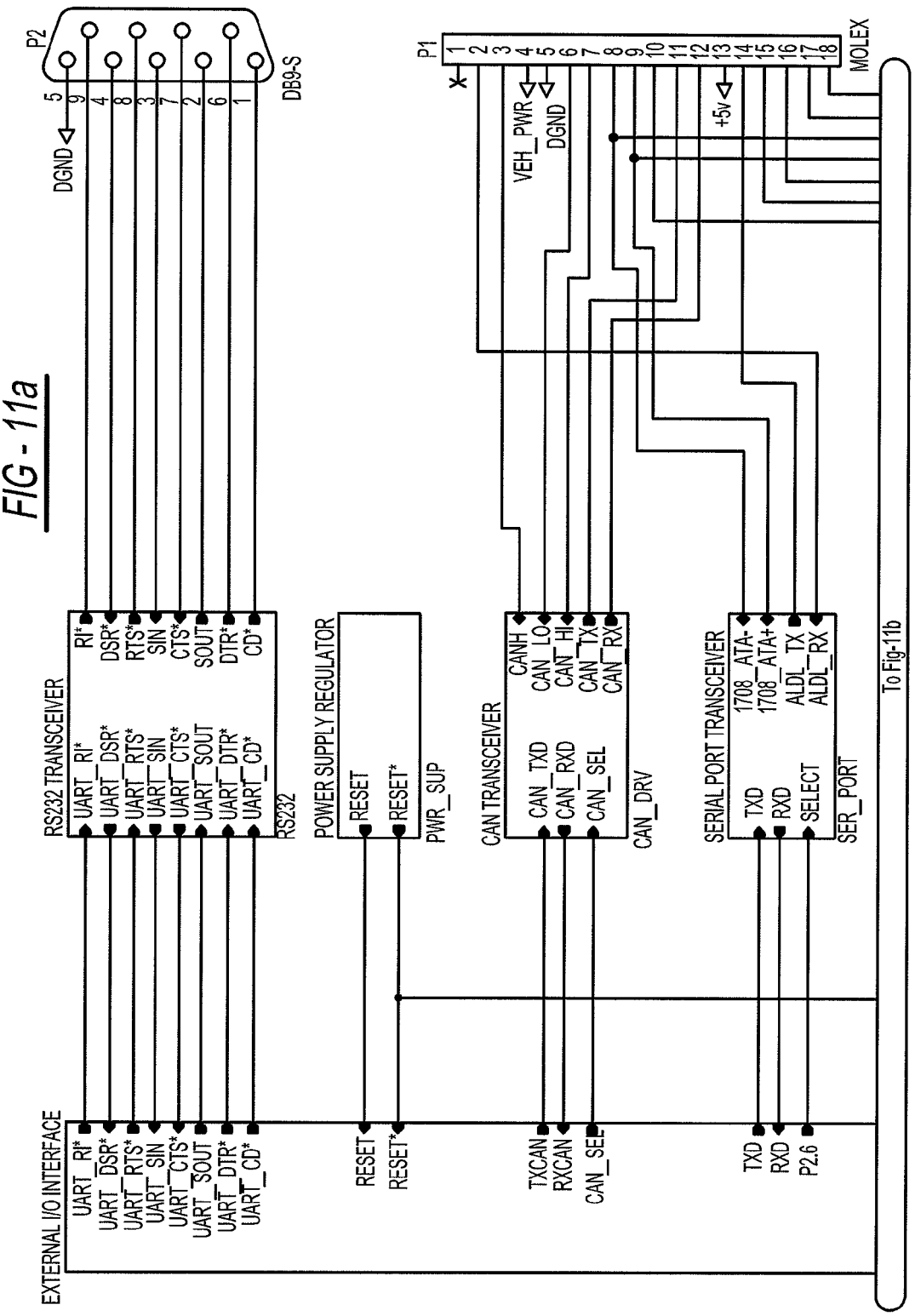
FIG. 11 illustrates DPA I/O Board.
Figure 11B:
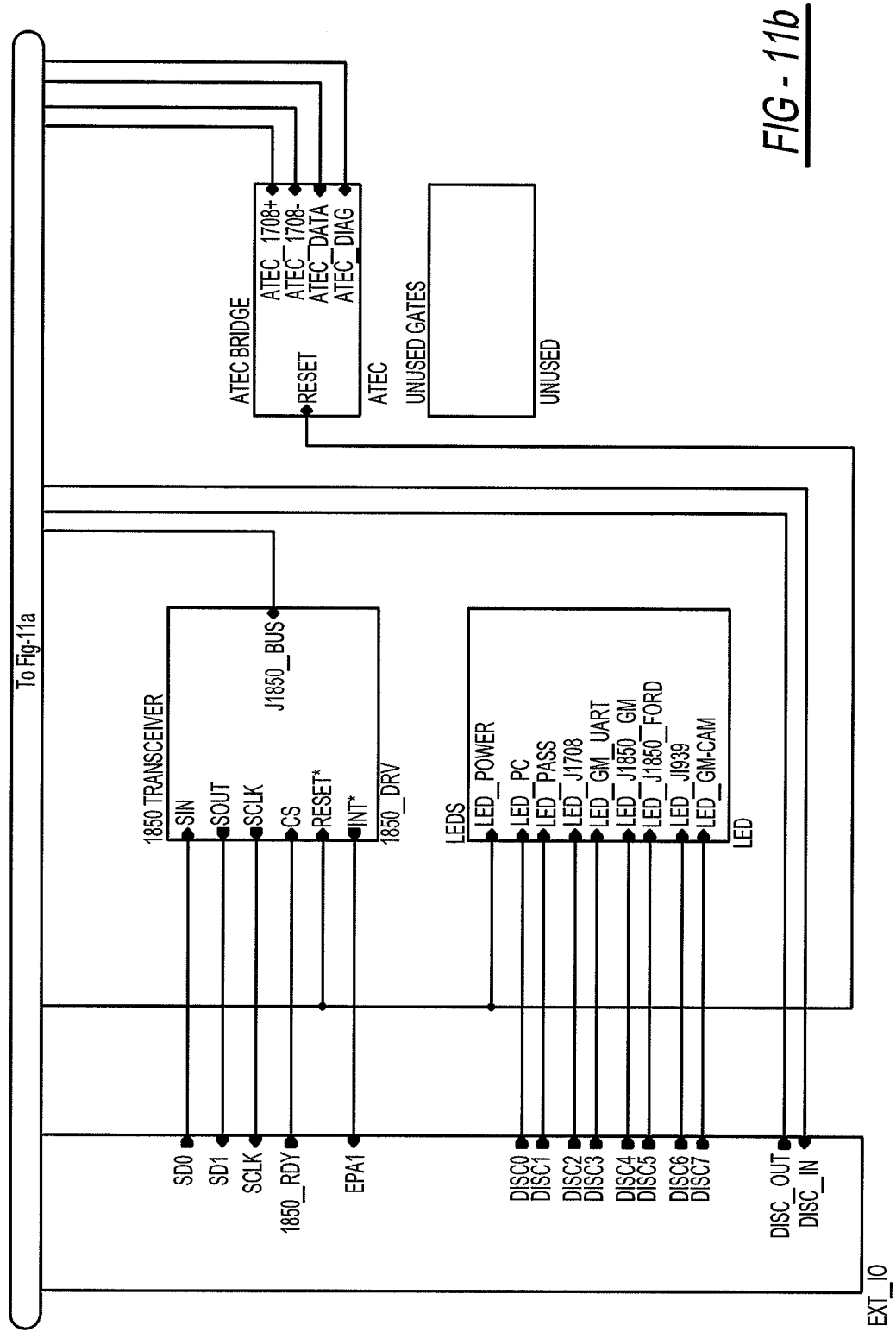
Figure 12:
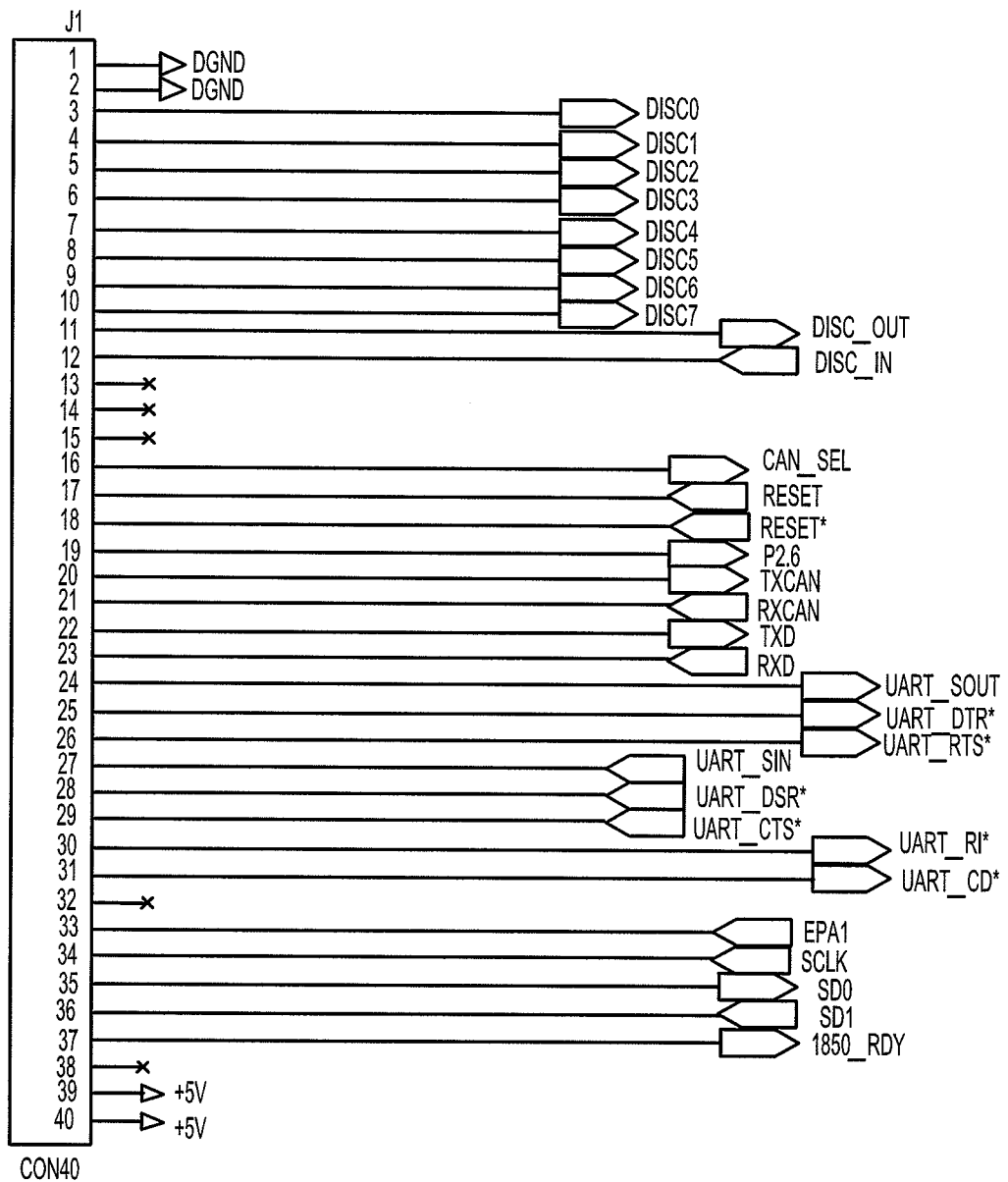
FIG. 12 illustrates I/O Interface Connector.
Figure 13:
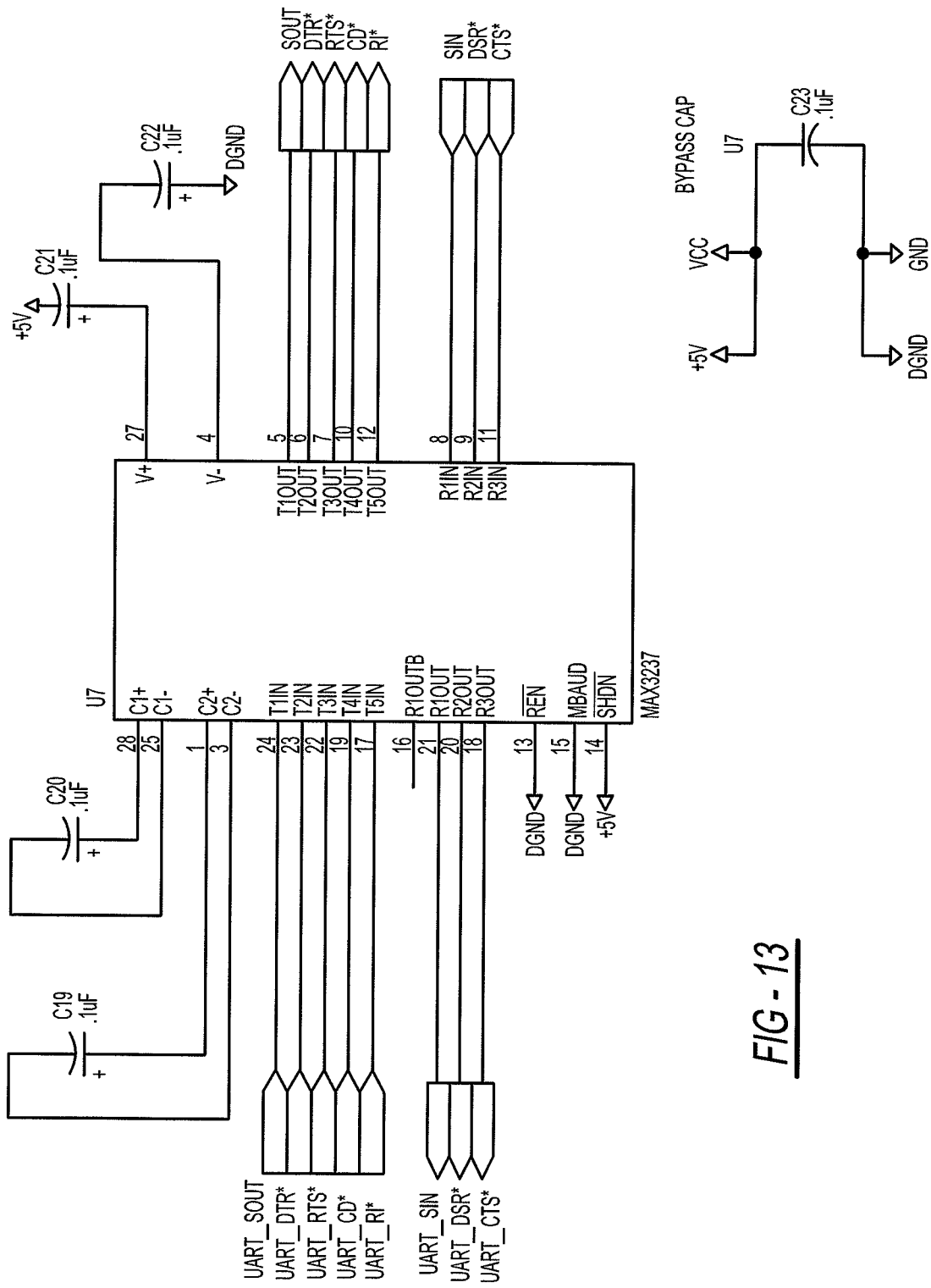
FIG. 13 illustrates RS-232 Transceivers.
Figure 14:
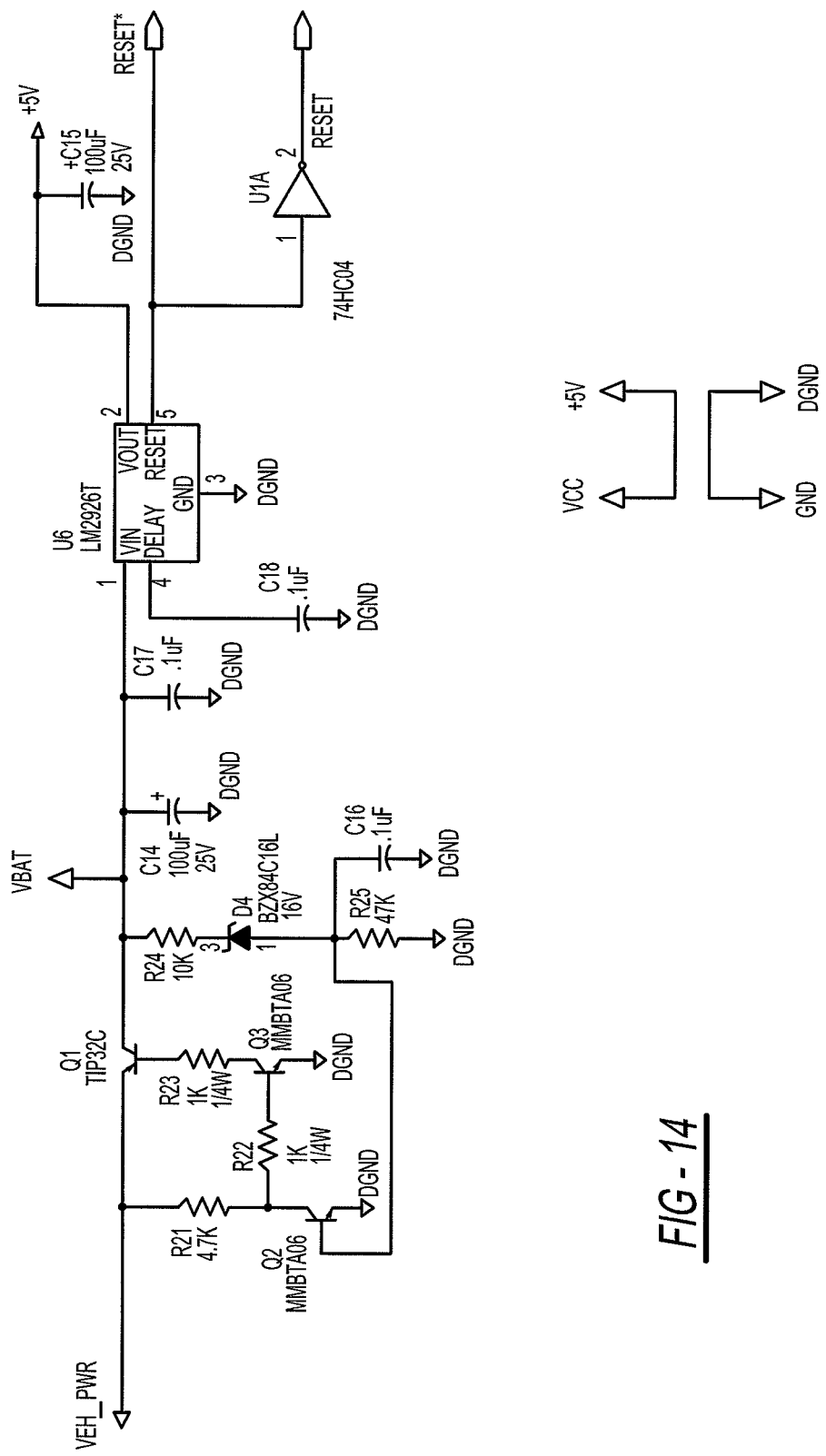
FIG. 14 illustrates Power Supply Regulator.
Figure 15:
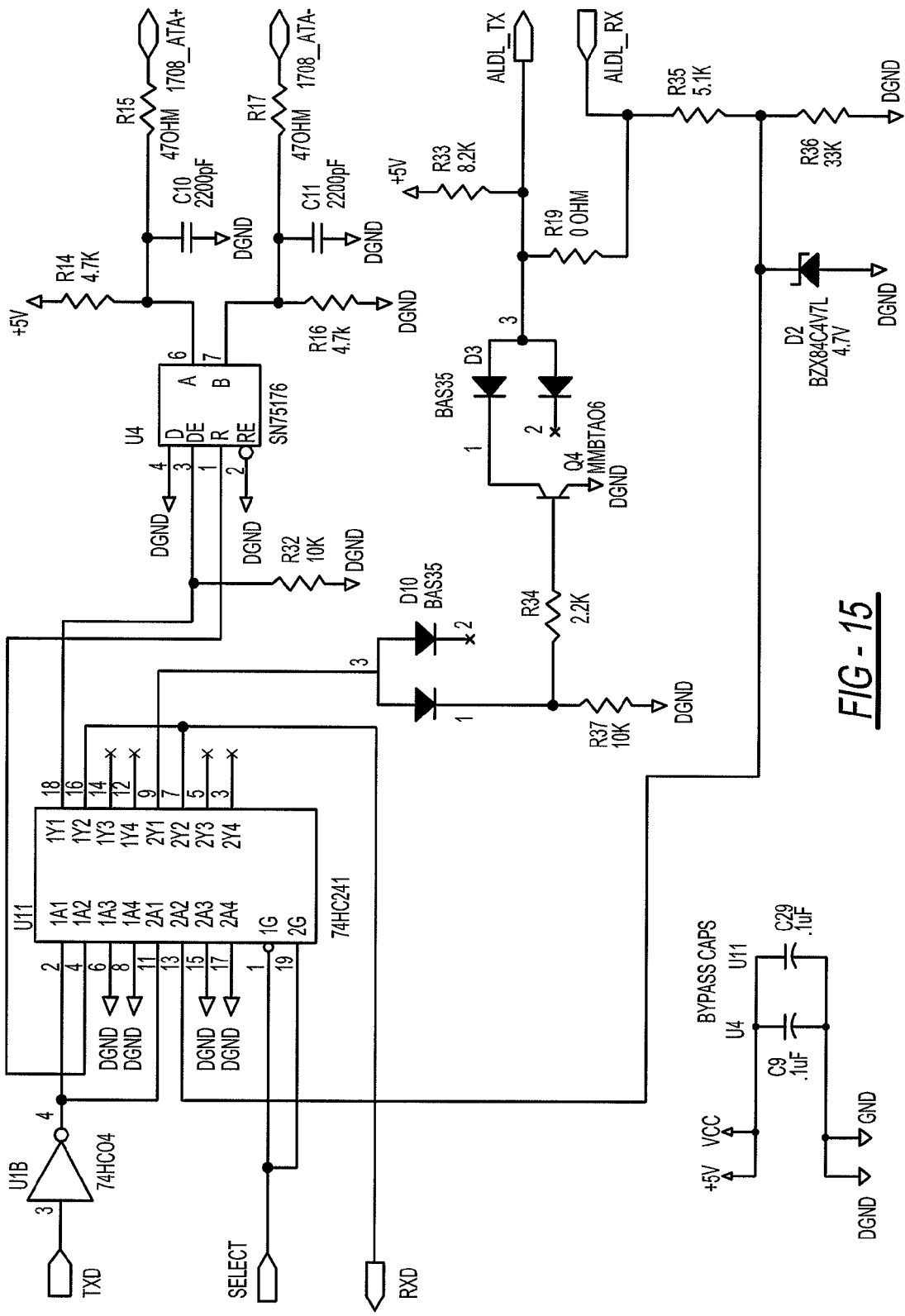
FIG. 15 illustrates 1708 Transceiver.
Figure 16:
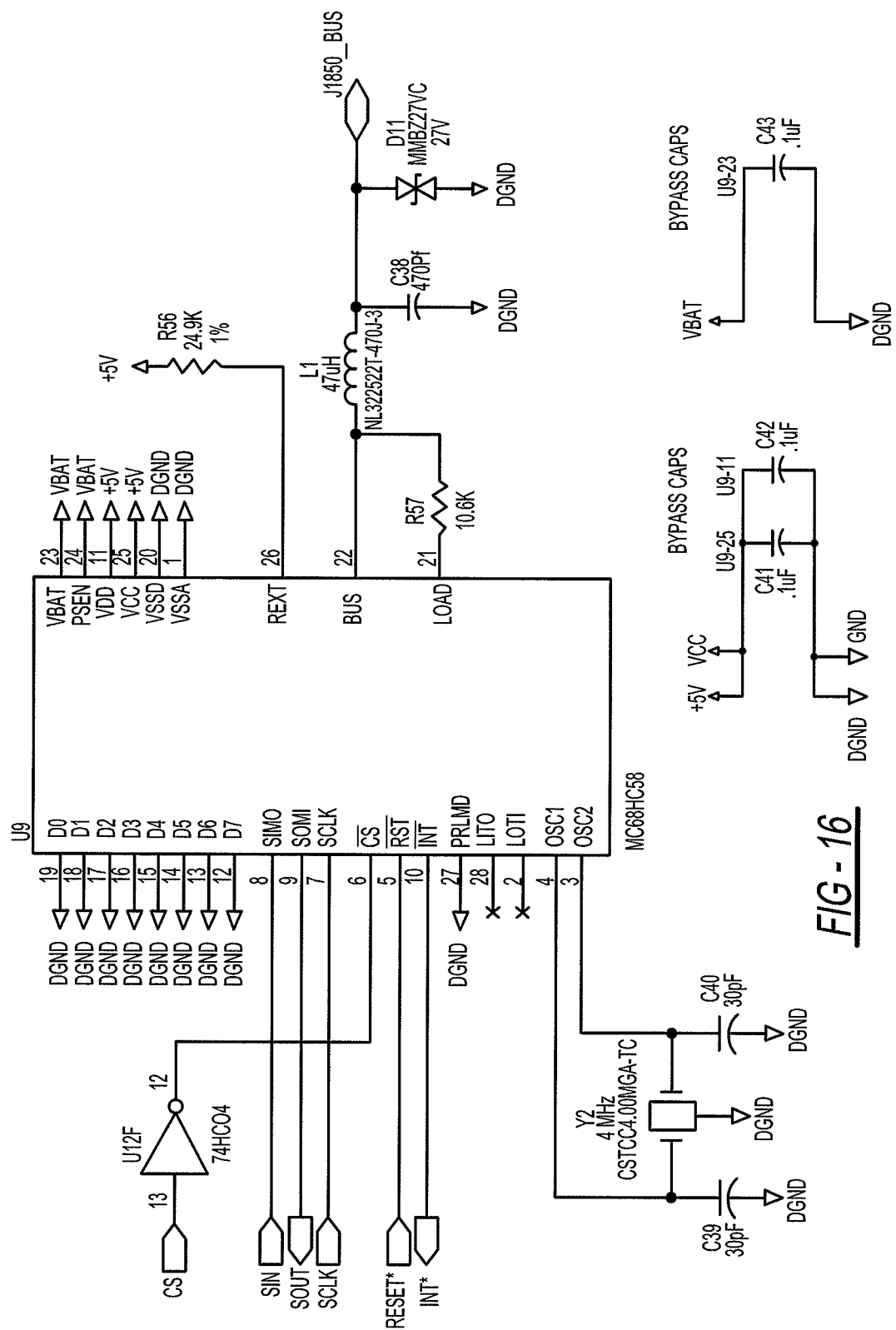
FIG. 16 illustrates J1850 Transceiver.
Figure 17:
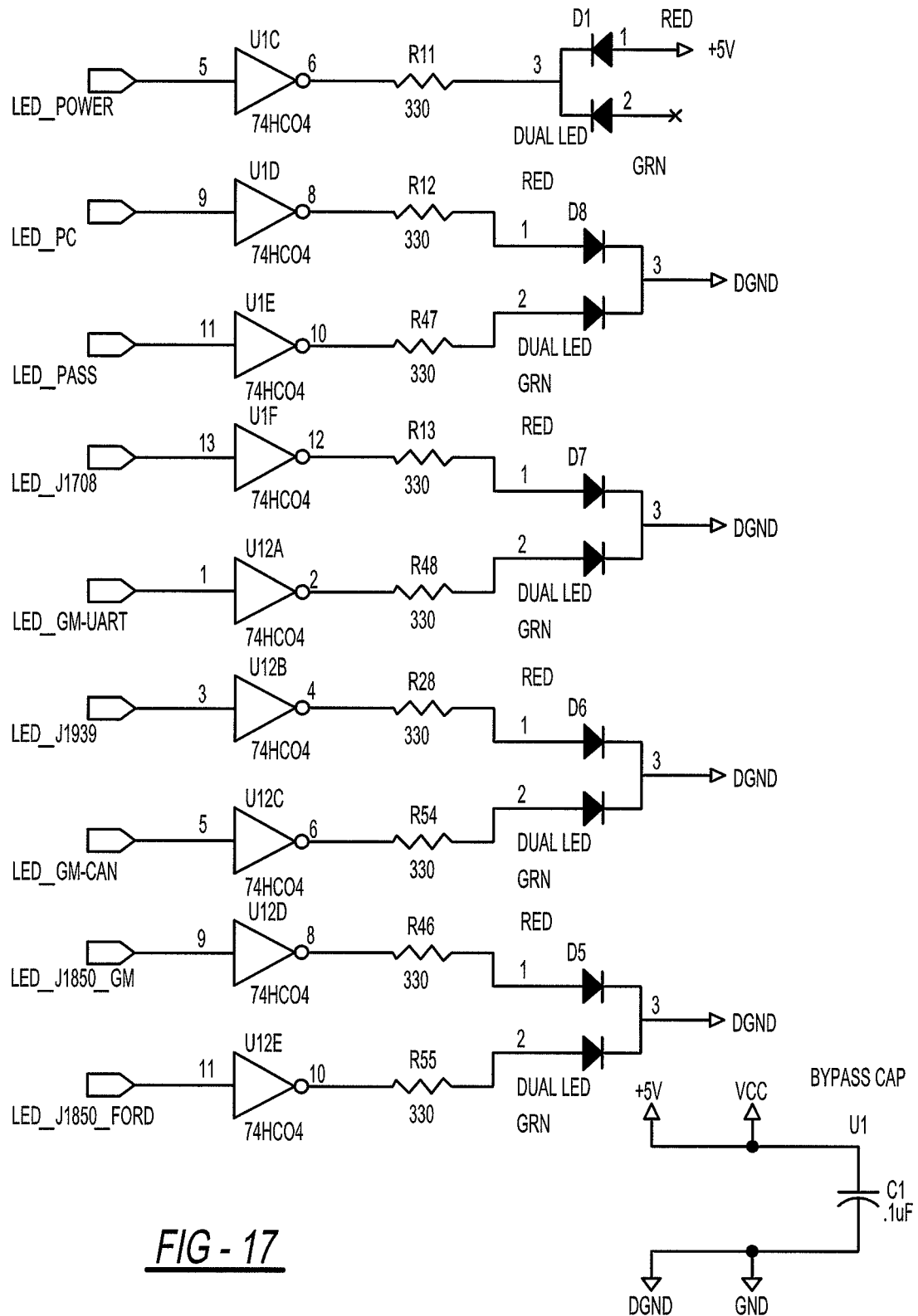
FIG. 17 illustrates LED Indicators.
Figure 18:
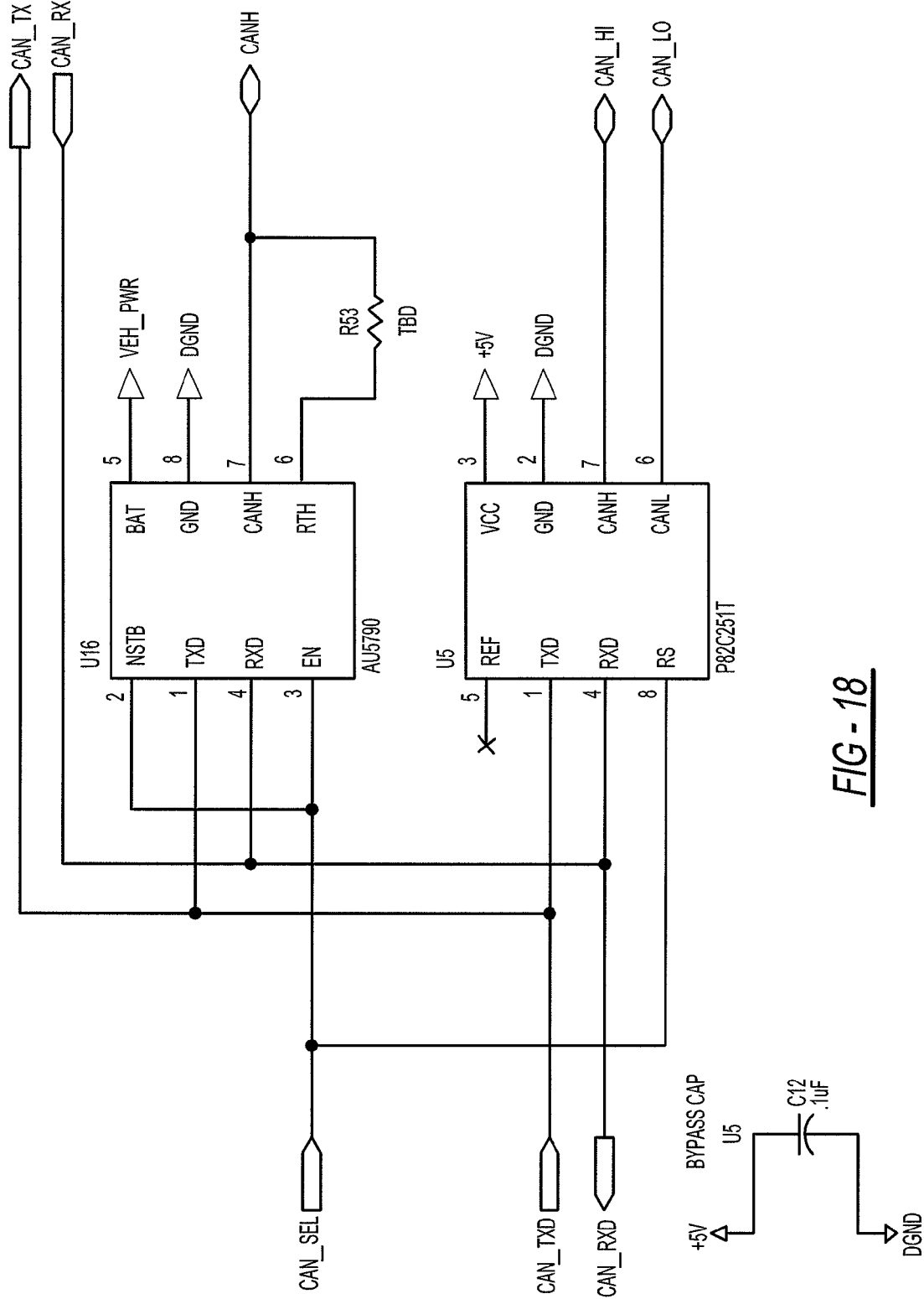
FIG. 18 illustrates CAN Transceiver.
Figure 19A:
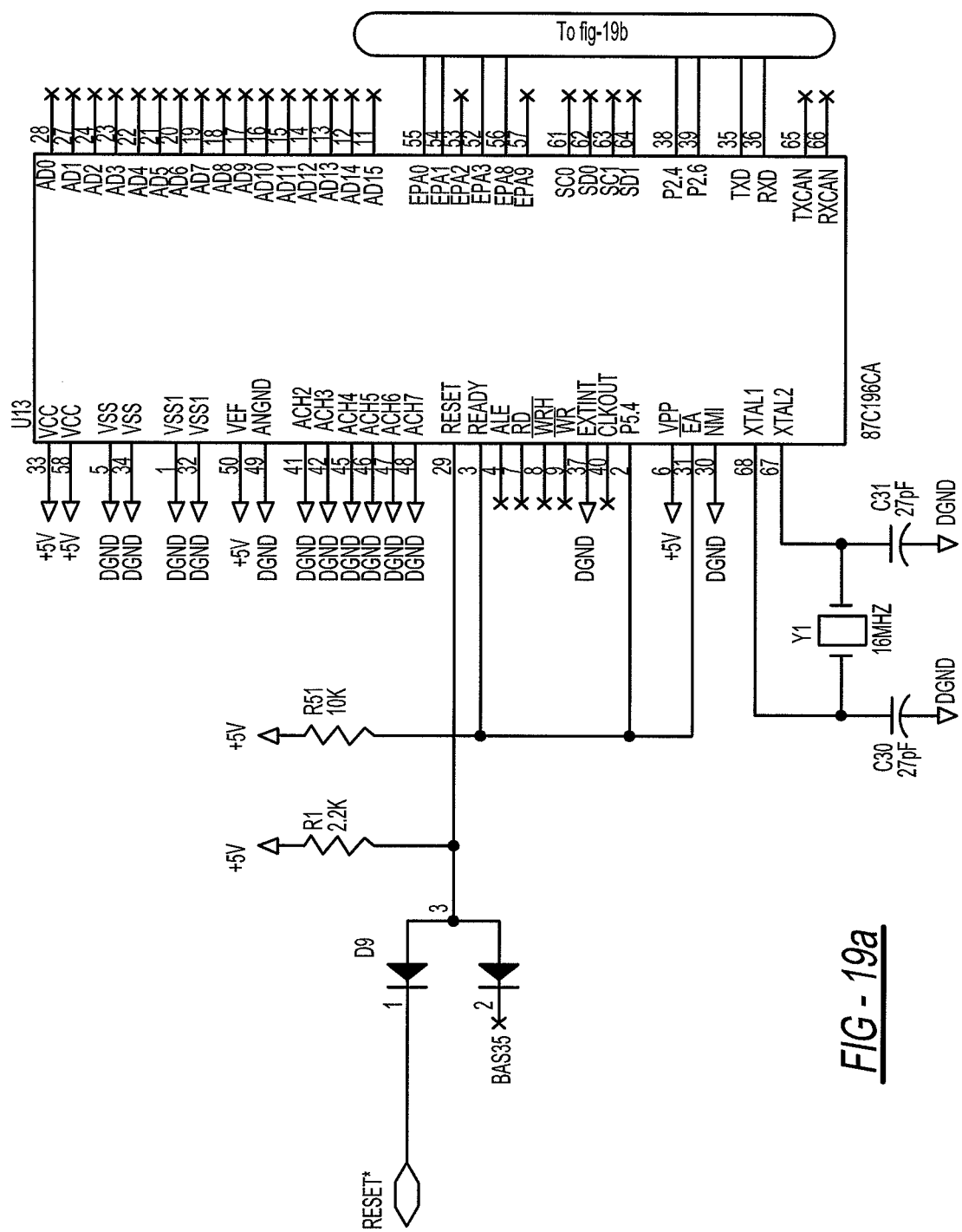
FIG. 19 illustrates ATEC to J1708 Bridge.
Figure 19B:
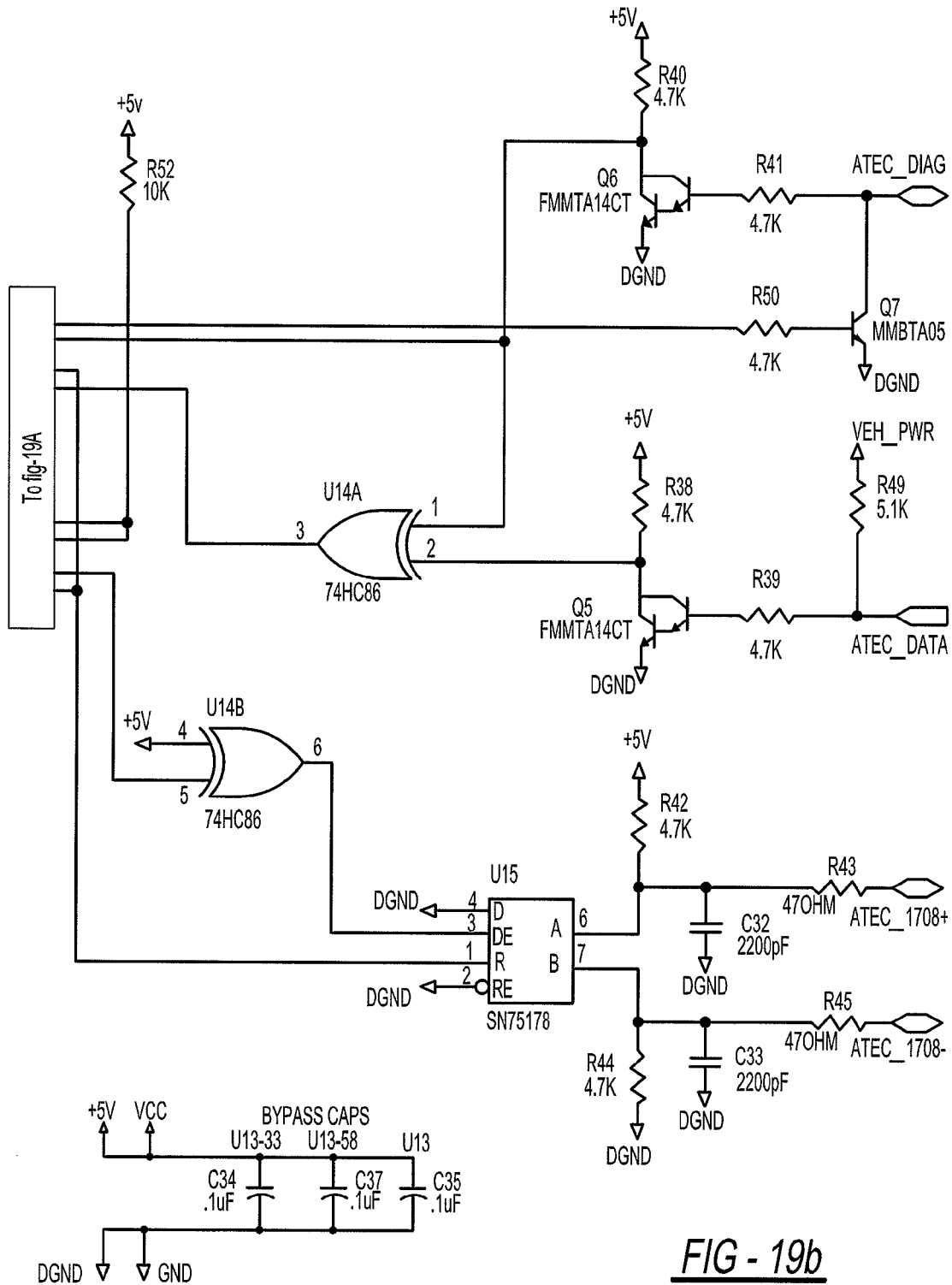

The following discussion of the embodiments of the invention directed to an expanded protocol adapter for transferring diagnostic signals between a vehicle network and a computer is merely exemplary in nature, and is in no way intended to limit the invention or its applications or uses.

The expanded protocol adapter of the invention supports the following protocols:
 SAE J1850 GM Class 2 protocol;
 SAE J1850 Chrysler protocol (future activation supported);
 GM Class 1 UART (ALDL) protocol;
 ISO 9141-2 protocol;
 ISO 9141-1989 protocol;
 ISO 9141-Special protocol (for Case Corp.);
 SAE J2284, Dual-wire CAN protocol; and
 SAE J2411, Single Wire CAN protocol (future activation supported).

The protocol adapter of the invention includes a special pass-through mode that allows users to continue utilizing yesterday's in-house software, while communicating with today's hardware. Older software packages such as RP1202 and RP1210 can still be employed. This feature allows users to replace aging hardware with an interface that can support existing software. Consequently, users can replace old hardware with the protocol adapter of the invention and yet maintain computability with their originals software.

The earlier protocol adapter supported SAE J1780, SAE J1939, and Control-Area (CAN) networks. The earlier adapter has a voltage converter mode that supports RS-232-to-RS-485 voltage conversion. The normal RS-232 port allows direct access to the J1708 / RS-485 link. The protocol adapter of the invention supports the listed prior protocol adapter features, including a library (DLLNxD for Windows) and on-board flash for field upgrades. The protocol adapter of the invention also employs a pass-through mode which supports communication with "old" software packages (e.g. RP1202 and RP1210(A).

The protocol adapter of the invention expands functionality and usage of the earlier protocol adapter and can be used with a half-slot ISA card or in a PC-104 card version.

The protocol adapter of the invention employs LED's to indicate status of the device, which mode of operation, and whether the adapter is in communication. Dual color LED's are used to indicate which program is being executed by the protocol adapter. The pass-through ability to emulate other protocol adapters is indicated by a dual color LED to indicate the pass-through is functioning to emulate other protocol adapters. Beyond the normal use of LED's, eight visual indicators are four dual-color LEDs (red and green). Three of the dual-color LEDs serve to notify the user which one of the six, user-selectable protocols is in use at any given time. The fourth dual-color LED indicates the mode of operation for the protocol adapter, the DPA III Plus, referred to as "DPA" for normal mode (red) or "PASS" for pass-through mode (green). While operating in the pass-through mode, the protocol adapter additionally supports communications with various "older" software packages, such as RP 1202 of RP1210, whereas in the normal mode, such additional support is not provided. Alternating red/green indicates reflash (reprogramming) is in progress.

The status of the LEDs indicate to the user the mode of operation for the device and which of the various protocols is currently active. The meaning of the LED indicator status will be described below.

It should be noted that earlier protocol adapters support communications with "older" protocols, but earlier protocol adapters do not provide an indication to the user as to which mode is being used (normal or pass-through).

Earlier protocol adapters used a single color LED that could only notify the user that there is RS232 bus activity between the device and the PC. The protocol adapter of the invention uses an LED in the same physical location, but a dual-color LED allows indication of which mode is being used. A red LED is used to indicate when power is applied to the unit.

The protocol adapter incorporates additional functionality for supporting the Dearborn Programmable Bridge (DPB) software. Compatibility with the DPB software allows this adapter to support translation of messages between any of the protocols currently in us, e.g., SAE J1939 to J1708. The addition of DPB capabilities is integrated into the functionality of the adapter is such a manner to the make the inclusion of support for these added capabilities transparent to the user.

The protocol adapter provides rapid access to any supported network by allowing the user to easily switch between protocols. This rapid access affords the user with the ability to monitor and translate messages between different protocols at the same time.

An ISA, half-card version and a PC-104 version of the protocol adapter provide most of the functionality as described herein except for two functions. The two functions not supported by the ISA half-card version and the PC-104 version of the protocol adapter are the pass-through mode of operation and the Dearborn Programmable Bridge (DPB) software compatibility.

The protocol adapter of the invention includes reflashing that allows the protocol adapter to be updated with new firmware in the field. This is accomplished by U5, U1, U8 and U4 shown in the figures. U5 (micro) processes a command sent to the protocol adapter by the host. It then copies the reflash instructions set (loader program) into RAM (U1) and then transfers control to that program (loader). The loader program responds to the commands from the host which allows the host computer to then clear and reprogram the Flash (U4). Once the reprogramming is complete control is passed back to the flash program.

The protocol adapter of the invention has status lights that allow the operator to determine what program is being executed by a protocol adapter embedded micro. U5 and U10 will flash the LEDs on the I/O board in a predefined manner at power up to indicate what version of firmware is being executed.

The protocol adapter of the invention has a pass-through feature (voltage translator)/smart mode that allows the protocol adapter to emulate older boxes. In this mode of operation, the U5 (micro) delivers data directly form the J1708 Transceiver (U11 of I/O board) to the RS232 transceiver (U7 of I/O board) and monitors the data to provide J1708 defined timing signals on any or all of the RS232 hardware handshake lines.

The expanded protocol adapter can be used wirelessly to perform ECU fault code interrogation, communication with a remote network, vehicle maintenance status checks or trip performance data downloads, and improved asset control, logistics and inventory management, diagnostic support, and maintenance/scheduling.

An ISA version of the protocol adapter of the invention is a half slot card that supports CAN (J1939 and DeviceNet), SAE J1850, and GM UART protocols.

The protocol adapter has additional unique features including bank switching, file upgrade capability, LED status, multiple datalinks, embedded versions, programmable manufacture's name, software locks, asynchronous transmit and receive, programmable timer and a scratch pad.

For bank switching, memory is swapped in and out of the processor's memory map to allow multiple programs to be run. For field upgrade capability, non-volatile memory can be programmed in the field to allow new software features to be added in the field. For LED status, LEDs are flashed in a unique sequence at power-up to indicated what version of firmware is being executed. Multiple data links may be supported at the same time. Firmware and hardware version numbers are available to the host to allow the host to determine current capabilities. The manufacturer's name is embedded in FLASH to allow VAR's to put in the name of the VAR's company.

Proprietary software lock/key may be burned into FLASH to allow use of the VAR's software. The protocol adapter is capable of receiving and transmitting asynchronously of host processor and can broadcast on transmit and filter on receive.

The protocol adapter has a programmable multi-function timer to support datalink communications. The scratch pad is a built-in remote access memory to allow the host to consolidate message data.

Features of the protocol adapter of the invention are supported for RP1202 and RP1210, J1708 and J1939, J1939 transport Layer. The protocol adapter has a Real Time Clock, Standard COMM port connection, 7-32 Volt Supply and is CE compliant.

Now turning to the drawings, the circuits of the protocol adapter of the invention are shown in FIGS. 1 through 20.

The pass through/smart mode is U11 (shown on FIG. 8) and is controlled by U5 (shown on FIG. 3) to determine if the host PC is listening to the J1708 link, or if the host PC is wanting to have a slave session with the DPA (diagnostic tool).

The U5 micro (FIG. 3) at power up will flash LEDs 2, 3, 4, and 5 (FIG. 26) to allow the operator to know what version of software is running inside the protocol adapter or diagnostic tool (DPA).

Figure 26:
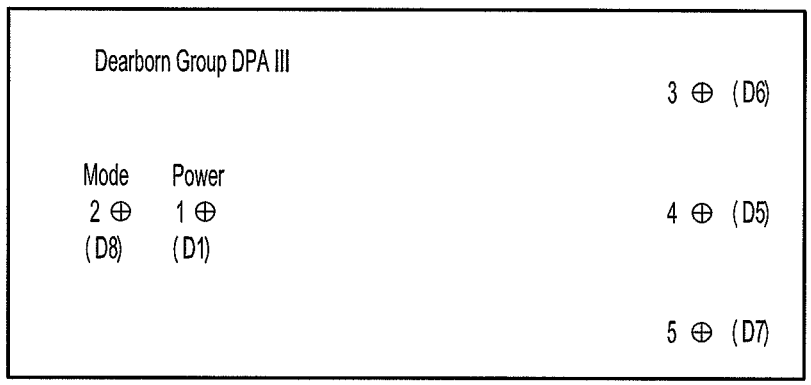
FIG. 26 illustrates LED layout diagram.

Now turning to FIGS. 21 through 25, the LED descriptions are thereshown with the LED diagram shown in FIG. 26.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A protocol adapter for wirelessly transferring diagnostic signals between a vehicle network and a computer, said protocol adapter comprising:

said protocol adapter is for transferring diagnostic signals between a vehicle network and a computer that is a lap-top or bench top computer where said protocol adapter is used as a diagnostic tool to bridge the computer to a vehicle network wherein said protocol adapter wirelessly performs ECU fault code interrogation, communication with a remote network, vehicle maintenance status checks or trip performance data downloads, and improved asset control, logistics and inventory management, diagnostic support and maintenance scheduling;

a plurality of electrical circuits and an RS232 bus, said circuits being capable of operating in more than one protocol, said circuits including a voltage translator for translating a voltage so that the protocol adapter operates in a pass-through mode;

a processor contained in the protocol adapter;

a processor memory map of the processor of said protocol adapter having a bank switching feature that is used to increase the amount of usable memory beyond the amount directly addressable by the processor, wherein memory is swapped in and out of the processor memory map to provide for multiple programs to be run on said protocol adapter, wherein said bank switching feature provides for field upgrade capability wherein non-volatile memory is programmed in the field such that new software features are added in the field.

2. The protocol adapter according to claim 1 wherein the protocol adapter transfers signals in a protocol selected from the group consisting of SAEJ1850 protocol, GM class 2 protocol, SAEJ1850 protocol, Chrysler protocol, GM Class 1 UART protocol, ISO9141-2 protocol, 1S09141-1989 protocol, ISO 9141-special protocol, SAEJ2284, dual-wire CAN protocol, SAEJ2411 protocol and single wire CAN protocol.

3. The protocol adapter according to claim 1 wherein the circuits include a static RAM module and a flash memory module for providing reflashing that allows the protocol adapter to be adapted with new firmware.

4. The protocol adapter according to claim 1 wherein the circuits include a J1708 transceiver for providing an interface between the vehicle network and the computer when the vehicle network is operating in a J1708 protocol.

5. The protocol adapter according to claim 1 wherein the circuits include a J1850 transceiver for providing an interface between the vehicle network and the computer when the vehicle network is operating in a J1850 protocol.

6. The protocol adapter according to claim 1 wherein the circuits include a controller area network (CAN) transceiver circuit for providing an interface between the vehicle network and the computer when the vehicle network is operating in a J1939 protocol.

7. The protocol adapter according to claim 1 wherein the circuits include an RS-232 transceiver circuit for providing an interface to an RS-232 port on the computer.

8. The protocol adapter according to claim 1 wherein the circuits include an universal asynchronous receive and transmit (UART) circuit for providing communication of asynchronous data to and from the computer.

9. The protocol adapter according to claim 1 further comprising a plurality of LEDs, said plurality of LEDs providing a visual indication of the protocol being used by the protocol adapter.

10. The protocol adapter according to claim 9 wherein the plurality of LEDs includes a plurality of dual colored LEDs.

11. The protocol adapter according to claim 10 wherein the plurality of dual colored LEDs are four dual colored LEDs, wherein three of the dual colored LEDs indicate which one of six user selected protocols is being used, and the fourth dual color LED indicates a mode of operation, including the pass-through mode.

12. The protocol adapter according to claim 1 wherein the protocol adapter communicates with the vehicle network and the computer wirelessly.

13. A protocol adapter for transferring diagnostic signals between a vehicle network and a computer, said protocol adapter comprising:

said protocol adapter is for transferring diagnostic signals between a vehicle network and a computer that is a lap-top or bench top computer where said protocol adapter is used as a diagnostic tool to bridge the computer to a vehicle network wherein said protocol adapter wirelessly performs ECU fault code interrogation, communication with a remote network, vehicle maintenance status checks or trip performance data downloads, and improved asset control, logistics and inventory management, diagnostic support and maintenance scheduling;

a static RAM module and a flash memory module for providing reflashing that allows the protocol adapter to be adapted with new firmware;

a J1708 transceiver for providing an interface between the vehicle network and the computer when the vehicle network is operating in a J1708 protocol;

a J1850 transceiver for providing an interface between the vehicle network and the computer when the vehicle network is operating in a J1850 protocol;

a controller area network (CAN) transceiver circuit for providing an interface between the vehicle network and the computer when the vehicle network is operated in a J1939 protocol;

an RS-232 transceiver circuit for providing an interface to an RS-232 port on the computer;

a processor contained in the protocol adapter;

a processor memory map of the processor of said protocol adapter having a bank switching feature that is used to increase the amount of usable memory beyond the amount directly addressable by the processor, wherein memory is swapped in and out of the processor memory map to provide for multiple programs to be run on said protocol adapter, wherein said bank switching feature provides for field upgrade capability wherein non-volatile memory is programmed in the field such that new software features are added in the field; and a universal asynchronous receive and transmit (UART) circuit for providing communication of asynchronous data to and from the computer.

14. The protocol adapter according to claim 13 wherein the protocol adapter includes a pass-through mode where the protocol adapter voltage translates signals between the vehicle network and the computer.

15. The protocol adapter according to claim 13 further comprising a plurality of LEDs, said plurality of LEDs providing a visual indication of the protocol being used by the protocol adapter.

16. The protocol adapter according to claim 15 wherein the plurality of LEDs includes a plurality of dual colored LEDs.

17. The protocol adapter according to claim 16 wherein the plurality of dual colored LEDs are four dual colored LEDs, where three of the dual colored LEDs indicate which one of six user selected protocols is being used, and the fourth dual color LED indicates a mode of operation, including a pass-through mode.

18. A protocol adapter for transferring diagnostic signals between a vehicle network and a computer, said protocol adapter comprising:

said protocol adapter is for transferring diagnostic signals between a vehicle network and a computer that is a lap-top or bench top computer where said protocol adapter is used as a diagnostic tool to bridge the computer to a vehicle network wherein said protocol adapter wirelessly performs ECU fault code interrogation, communication with a remote network, vehicle maintenance status checks or trip performance data downloads, and improved asset control, logistics and inventory management, diagnostic support and maintenance scheduling;

a J1708 transceiver for providing an interface between the vehicle network and the computer when the vehicle network is operating in a J1708 protocol;

a J1850 transceiver for providing an interface between the vehicle network and the computer when the vehicle network is operating in a J1850 protocol;

a controller area network (CAN) transceiver circuit for providing an interface between the vehicle network and the computer when the vehicle network is operated in a J1939 protocol;

a processor contained in the protocol adapter;

a processor memory map of the processor of said protocol adapter having a bank switching feature that is used to increase the amount of usable memory beyond the amount directly addressable by the processor, wherein memory is swapped in and out of the processor memory map to provide for multiple programs to be run on said protocol adapter, wherein said bank switching feature provides for field upgrade capability wherein non-volatile memory is programmed in the field such that new software features are added in the field; and a plurality of LEDs, said plurality of LEDs providing a visual indication of the protocol being used by the protocol adapter, wherein the plurality of LEDs includes a plurality of dual colored LEDs.

19. The protocol adapter according to claim 18 further comprising a static RAM module and a flash memory module for providing reflashing that allows the protocol adapter to be adapted with new firmware.

20. The protocol adapter according to claim 18 further comprising an RS-232 transceiver circuit for providing an interface to an RS-232 port on the computer.

21. The protocol adapter according to claim 18 further comprising a universal asynchronous receive and transmit (UART) circuit for providing communication of asynchronous data to and from the computer.

22. The protocol adapter according to claim 18 wherein the plurality of dual colored LEDs are four dual colored LEDs, wherein three of the dual colored LEDs indicate which one of six user selected protocols is being used, and the fourth dual color LED indicates a mode of operation, including a pass-through mode.

23. The protocol adapter according to claim 18 wherein the protocol adapter includes a pass-through mode where the protocol adapter voltage translates signals between the vehicle network and the computer.

24. The protocol adapter according to claim 18 wherein the protocol adapter communicates with the vehicle network and the computer wirelessly.

\* \* \* \* \*